(12) United States Patent
Klingen

(10) Patent No.: US 9,088,638 B1
(45) Date of Patent: Jul. 21, 2015

(54) SYSTEM AND METHOD FOR FACILITATING SECURE VOICE COMMUNICATION OVER A NETWORK

(75) Inventor: Mike Klingen, Phoenix, AZ (US)

(73) Assignee: Apriva, LLC, Scottsdale, AZ (US)

(*) Notice: Subject to any disclaimer, the term of this patent is extended or adjusted under 35 U.S.C. 154(b) by 0 days.

(21) Appl. No.: 12/553,901

(22) Filed: Sep. 3, 2009

(51) Int. Cl.
*H04L 12/66* (2006.01)
*H04M 7/00* (2006.01)
*H04L 29/06* (2006.01)

(52) U.S. Cl.
CPC .......... *H04M 7/0081* (2013.01); *H04L 29/0617* (2013.01); *H04L 29/06163* (2013.01); *H04L 29/06176* (2013.01); *H04L 29/06326* (2013.01); *H04L 63/08* (2013.01)

(58) Field of Classification Search
CPC ........... H04M 7/0081; H04L 29/06163; H04L 29/0617; H04L 29/06176; H04L 29/06326; H04L 63/08
USPC ........................................................ 380/255
See application file for complete search history.

(56) References Cited

U.S. PATENT DOCUMENTS

| | | | |
|---|---|---|---|
| 6,427,174 B1 | 7/2002 | Sitaraman et al. | |
| 6,738,803 B1 | 5/2004 | Dodrill et al. | |
| 7,016,328 B2 | 3/2006 | Chari et al. | |
| 7,076,251 B2 | 7/2006 | Jagadeesan et al. | |
| 7,133,384 B2 | 11/2006 | Park et al. | |
| 7,228,558 B1 | 6/2007 | Lebouill | |
| 7,310,527 B2 | 12/2007 | Jagadeesan et al. | |
| 7,440,459 B2 | 10/2008 | Casati | |
| 7,586,879 B2 | 9/2009 | Chari et al. | |
| 7,630,341 B2 | 12/2009 | Buddhikot et al. | |
| 7,792,972 B2 | 9/2010 | Kamata et al. | |
| 7,873,993 B2 | 1/2011 | King | |
| 8,059,641 B1 | 11/2011 | Rai | |
| 8,060,017 B2 | 11/2011 | Schlicht et al. | |
| 2001/0046215 A1 | 11/2001 | Kim | |
| 2002/0009066 A1 | 1/2002 | Shimizu et al. | |
| 2002/0032853 A1* | 3/2002 | Preston et al. | 713/151 |
| 2002/0068554 A1 | 6/2002 | Dusse | |
| 2002/0154627 A1 | 10/2002 | Abrol et al. | |
| 2005/0076069 A1* | 4/2005 | Deo et al. | 707/203 |
| 2005/0213574 A1 | 9/2005 | Yoshimura et al. | |
| 2006/0056393 A1 | 3/2006 | Sarmiento | |

(Continued)

OTHER PUBLICATIONS

Office Action dated Dec. 16, 2011 in U.S. Appl. No. 12/553,950.

(Continued)

*Primary Examiner* — Kambiz Zand
*Assistant Examiner* — Ayoub Alata
(74) *Attorney, Agent, or Firm* — Law Offices of David O. Caplan, PLLC

(57) ABSTRACT

The present invention involves providing secure Voice Over IP (VOIP) communications to a mobile communications device. Specifically, the disclosed systems and methods enable a standard remote communications device (e.g., a cellular telephone) to utilize the Secure Communications Interoperability Protocol (SCIP) as designed by the U.S. Department of Defense. The invention provides SCIP access to users without requiring specific hardware configurations to be built into, or added to, the remote communications device. The remote communications device is equipped with software that emulates what was previously accomplished through a hardware configuration in order to facilitate secure VOIP communications over standard mobile communication devices.

23 Claims, 20 Drawing Sheets

(56) References Cited

U.S. PATENT DOCUMENTS

| | | |
|---|---|---|
| 2006/0083199 A1 | 4/2006 | Yang |
| 2006/0133341 A1 | 6/2006 | Chari et al. |
| 2006/0182131 A1 | 8/2006 | Dziekan |
| 2007/0115899 A1 | 5/2007 | Ovadia et al. |
| 2007/0121849 A1 | 5/2007 | Uhlik et al. |
| 2008/0056295 A1* | 3/2008 | Loda et al. .................. 370/437 |
| 2008/0200168 A1 | 8/2008 | Jiang |
| 2009/0158398 A1 | 6/2009 | Pandey et al. |
| 2010/0267383 A1 | 10/2010 | Konstantinou et al. |

OTHER PUBLICATIONS

Office Action dated Dec. 21, 2011 in U.S. Appl. No. 12/553,947.
Office Action dated Feb. 17, 2012 in U.S. Appl. No. 12/553,908.
Office Action dated Mar. 15, 2012 in U.S. Appl. No. 12/553,937.
Office Action dated Sep. 11, 2012 in U.S. Appl. No. 12/553,947.
Office Action dated Sep. 12, 2012 in U.S. Appl. No. 12/553,950.
Final Office Action dated Oct. 15, 2012 in U.S. Appl. No. 12/553,937.
Final Office Action dated Oct. 17, 2012 in U.S. Appl. No. 12/553,908.
Notice of Allowance dated Mar. 19, 2013 in U.S. Appl. No. 12/553,947.
Notice of Allowance dated Mar. 21, 2013 in U.S. Appl. No. 12/553,950.
Final Office Action dated May 22, 2013 in U.S. Appl. No. 12/553,937.
Notice of Allowance dated Sep. 25, 2013 in U.S. Appl. No. 12/553,908.
Final Office Action dated Mar. 28, 2014 in U.S. Appl. No. 12/553,937.
Office Action dated Nov. 24, 2014 in U.S. Appl. No. 12/553,937.

* cited by examiner

SYSTEM AND METHOD FOR FACILITATING SECURE VOICE COMMUNICATION OVER A NETWORK

FIELD OF THE INVENTION

This invention relates generally to a method and system to provide a secure solution for wireless Voice Over Internet Protocol (VOIP). The present invention may be utilized by a commercial wireless network, for example, utilizing Code Division Multiple Access (CDMA) or the Global System for Mobile communications (GSM).

BACKGROUND

Voice over Internet protocol (VOIP) technology has enabled users to transmit voice conversations over a data network using Internet Protocol (IP). This is facilitated by digitizing voice into discrete packets that are transferred independently over the network, instead of traditional circuit-committed protocols of the PSTN.

Initially, VOIP technology was limited to Personal Computers (PC) with a hard-wired connection to the Internet. However, as wireless networking technology has advanced, such VOIP capabilities have expanded to cellular telephones and other wireless devices. VOIP has offered many benefits including, for example, free or reduced fees related to conventional telephone calls over an analog network.

Because VOIP is based on the Internet infrastructure, voice communications are susceptible to eavesdropping, just as other Internet based transactions are. As in the case of standard data transfer over the Internet, efforts have been made to secure VOIP transactions from interference or receipt by unauthorized users. One such effort has been significantly successful in achieving this objective. The U.S. government developed Secure Communication Interoperability Protocol (SCIP) is a proven method for securing VOIP transmissions. However, prior art communications devices that were SCIP operational, required specifically configured hardware in order to utilize the protocol. In other words, an individual wishing to conduct secure VOIP was required to purchase a specific mobile communications device, or add additional hardware to an additional device. Accordingly, such a solution was not only costly, but did not afford the user to select a communications device of choice.

Therefore, a need exists for a system and method for enabling secure VOIP communications without requiring specialized hardware. Specifically, there is a need to provide secure VOIP to users of existing communications devices that are not equipped with the hardware configurations required to facilitate secure VOIP communications by way of SCIP or similar protocols.

SUMMARY OF THE INVENTION

In general, the present invention overcomes the limitations and problems of the prior art by providing a system and method for facilitating interoperability with existing secure voice solutions. The present invention is capable of supporting the SCIP specifications for end-to-end signaling, interoperability, cryptography, and secure session establishment.

Specifically, the invention overcomes the lack of access to secure VOIP by way of SCIP. The system of the present invention enables a device that is not hardwired to enable SCIP secure communications to facilitate SCIP compliant communications through a software exclusive process. In other words, the present invention enables a user of a standard communications device such as, for example, a cellular telephone to receive program code to enable the user to select a communications protocol, and facilitate the call using either a packet switched protocol or a non-packet switched protocol.

The functionality of the invention is provided by a remote communications device capable of receiving software code at the remote communications device. The software code enables the remote communications device to facilitate secure network communications by way of a SCIP session, receiving a request at the remote communications device to facilitate a secure network communication by way of a SCIP session, performing transmission setup signaling, and establishing a SCIP session based on the transmission setup signaling.

Moreover, the system provides management of VOIP calls using either a packet switched protocol or a non-packet switched protocol. Accordingly, the system provides software code to a remote communications device. The software code at the remote communications device receives a selection from a user to facilitate communication by way of either a packet switched protocol or a non-packet switched protocol. The software code processes the protocol selection to determine a protocol selection and enables the packet switched protocol and disables the non-packet switched protocol when the protocol selection is the packet switched protocol. The software code also enables the non packet switched protocol and disables the packet switched protocol when the protocol selection is the non packet switched protocol.

BRIEF DESCRIPTION OF EXEMPLARY DRAWINGS

A more complete understanding of the present invention may be derived by referring to the detailed description and claims when considered in connection with the Figures, wherein like reference numbers refer to similar elements throughout the Figures, and:

DETAILED DESCRIPTION OF EXEMPLARY EMBODIMENTS

Figure 1:
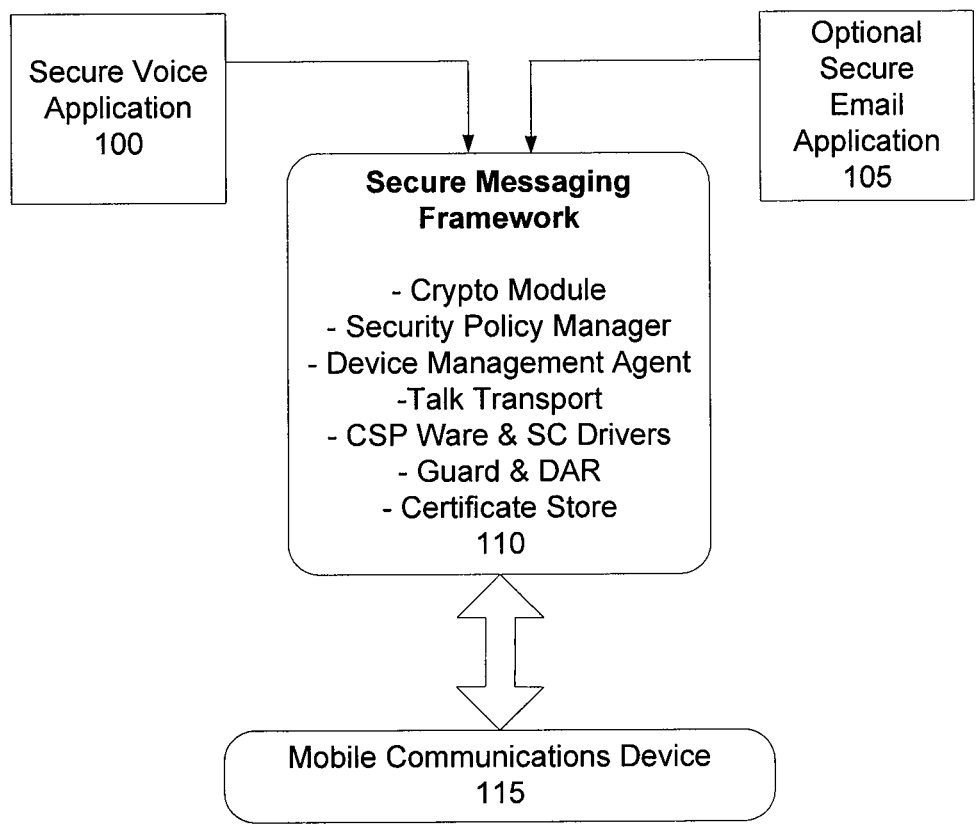
FIG. 1 illustrates a high-level view of the various system modules to provide secure VOIP in accordance with an exemplary embodiment of the present invention.

In general, the present invention uniquely integrates a design and communications system architecture for a Communication Software Application CSA. The subsequent description of the invention includes both the description of the CSA software client application, as well as the overall system architecture elements, such as a Secure Gateway and Session Initiation Protocol (SIP) Server as necessary, such that one of ordinary skill in the art may appreciate the present invention in full. However, it should be understood that such illustration of CSA 100 relative to various servers, databases and networks does not limit the scope of the invention.

In one embodiment, as will be discussed in greater detail herein, the CSA enables a Non-Type 1 secure solution for wireless voice over IP (VOIP) and email. The disclosed invention may be utilized by, for example, providers of digital networks in general, and more specifically, carriers providing commercial wireless third generation of telecommunication hardware standards (3G) networks utilizing Code Division Multiple Access (CDMA), Global System for Mobile communications (GSM) and/or any other present and future communication architectures and protocols.

In order to achieve interoperability with existing secure voice solutions, the CSA supports the SCIP specifications for end-to-end signaling, interoperability, cryptography, and secure session establishment. In accordance with another embodiment, the invention may integrate any other presently known or future implementations relating to exchanges of communications including, but not exclusive to, voice communications.

While the subsequent description primarily focuses on securing VOIP communications, practitioners will appreciate that other benefits and advantages may be addressed through the integration of other technologies in order to achieve other advantages.

Accordingly, in order to address voice quality issues, which have been a problem with prior art VOIP systems, the present invention seeks to provide new benefits to modem communication. For example, many opponents of VOIP have based their objections on quality degradation due to inherent packet loss, jitter, and end-to-end delay, which are not found in legacy circuit switched applications. Thus, the present invention seeks to achieve high performance capabilities at the mobile communications device and within the gateway.

As used herein, VOIP may comprise any combination of software and/or hardware components that enable transmission of voice conversations over a data network by way of IP. As those of ordinary skill in the art will may appreciate, VOIP is facilitated by digitizing voice into discrete packets that are transferred independently over the data network, instead of traditional circuit-committed protocols of a Public Switched Telephone Network (PSTN).

In one embodiment, application prioritization and precedence may occur such that the CSA voice application receives priority over resource competitive applications on the remote communications device. For example, resident applications may prioritize CSA 100 voice frames over large data packets before entering the network. Efficient jitter buffering may also be implemented in order to minimize the effects of network jitter and delay.

Standard VOIP Quality of Service (QoS) methods, such as Differentiated Service (DiffServ) or TOS, may be used to assist in prioritization of voice frames as they transit network routers and switches within intermediary networks. Additionally, routing voice frames through Multi-Carrier Entry Point (MCEP) results in reduced delays, as has been a problem with prior art VOIP architectures.

With reference to FIG. 1, the CSA voice application is intended to provide Clear and Secure VOIP (CSV) services. In order to support a wide array of present Clear CSV features, CSA may provide control and cooperation with a native CSV voice application.

In an exemplary embodiment, CSA 100 is decomposed into manageable, efficient, and cohesive entities. The proceeding software modules have been contemplated in order to accomplish these objectives in an efficient and reliable manner. However, practitioners will appreciate that the described functionality of the following modules may be combined or divided in any manner without departing from the scope of the invention. Moreover, each of the disclosed modules and/or subsystems may provide defined services to the other modules; either internal or external to CSA 100.

Figure 2:
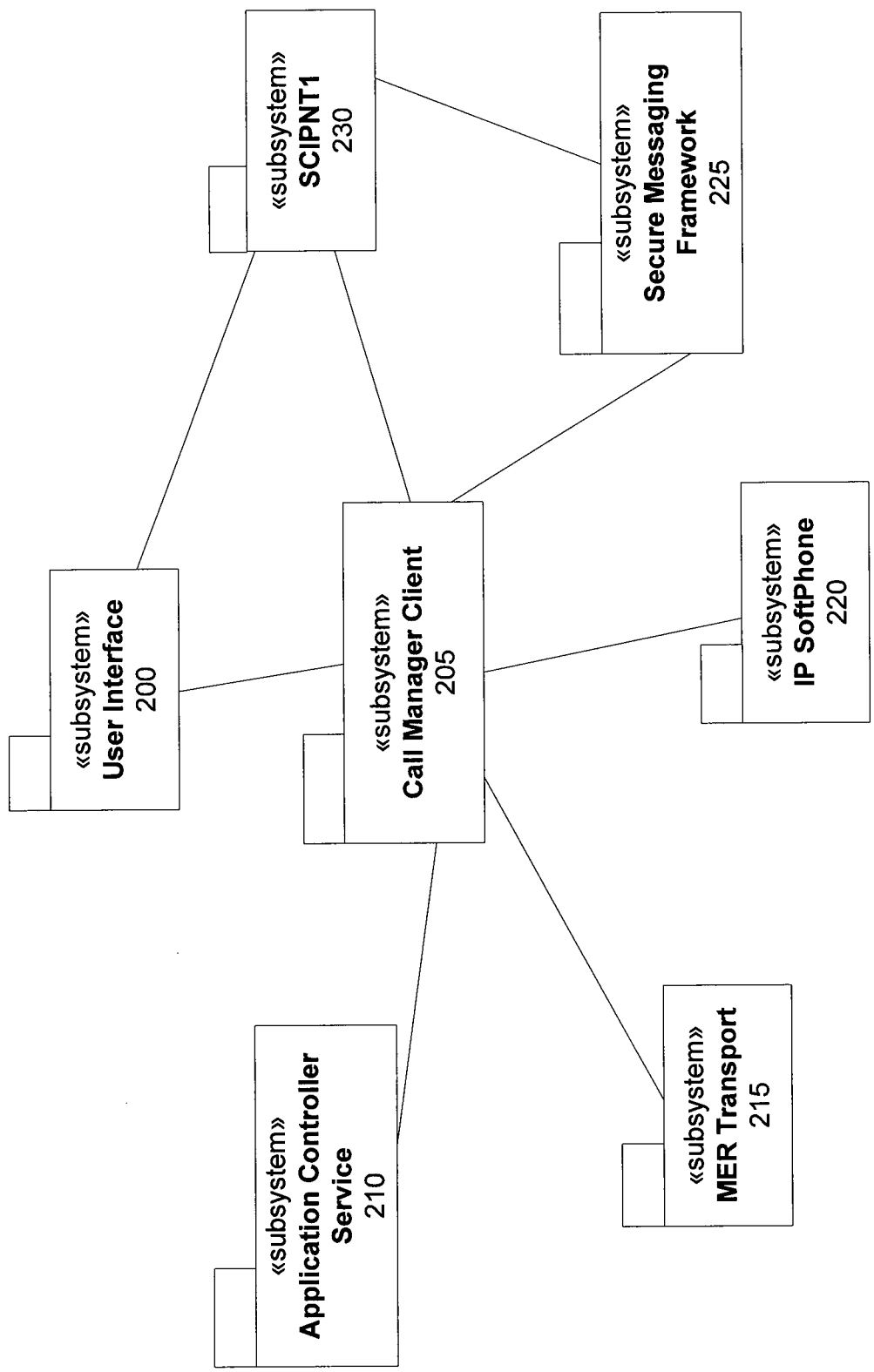
FIG. 2 illustrates an exemplary schematic overview of the subsystems for providing secure VOIP.

Specifically, FIG. 1 illustrates an embodiment of the subsystem decomposition for the CSA voice application. The connecting lines between each module indicate control paths. Each subsystem is subsequently explained and detailed herein. However, FIG. 2 provides a high level view of the modules that may be discussed in greater detail herein.

In accordance with one embodiment, the user interface control and view elements may be removed from the concern of a SoftPhone or SCIP subsystem. As such, the user interface design may follow the Model/View/Controller (MVC) architectural style depicted in FIG. 3. The MVC architecture partitions the involved subsystems into models, views, or controllers. The model maintains domain knowledge; the view displays the data to the user, and the controller manages external interactions, which may alter the model state.

As used herein, a SoftPhone may comprise any combination of computing hardware and/or software configured to enable voice communications via a computer implemented device utilizing VOIP. Practitioners will appreciate that a SoftPhone may facilitate voice communications to standard phones, mobile phones, and other SoftPhones.

As used herein, SCIP may comprise any combination of computing hardware and/or software configured to provide secure voice and/or data communications over a network. Those of ordinary skill in the art will appreciate that SCIP is presently the U.S. Government's standard for secure voice and data communication. This standard is designed to cover wideband as well as narrowband voice and data security. SCIP is intended to operate over a wide variety of communications systems, including commercial land line telephone, military radios, communication satellites, Voice over IP, and disparate cellular telephone protocols. It should be further noted, that while frequent mention to SCIP is made herein, the invention is not so limited. The disclosed system for facilitating secure communications over a network may utilize any presently known or future secure voice and/or data protocols over a wireline and/or wireless network.

In one embodiment, the design pattern supports the MVC architectural style by reducing the coupling with the user interface and enhances reusability of the core application. Accordingly, the view objects of the user interface may subscribe to a defined set of objects in the core voice application. Whenever the model objects incur a state modification, the user interface is notified and presents the data to the user in a manner defined by the user interface. It is not necessary for the core voice application to maintain any knowledge or concern of the presentation of the data to the user.

Figure 3:
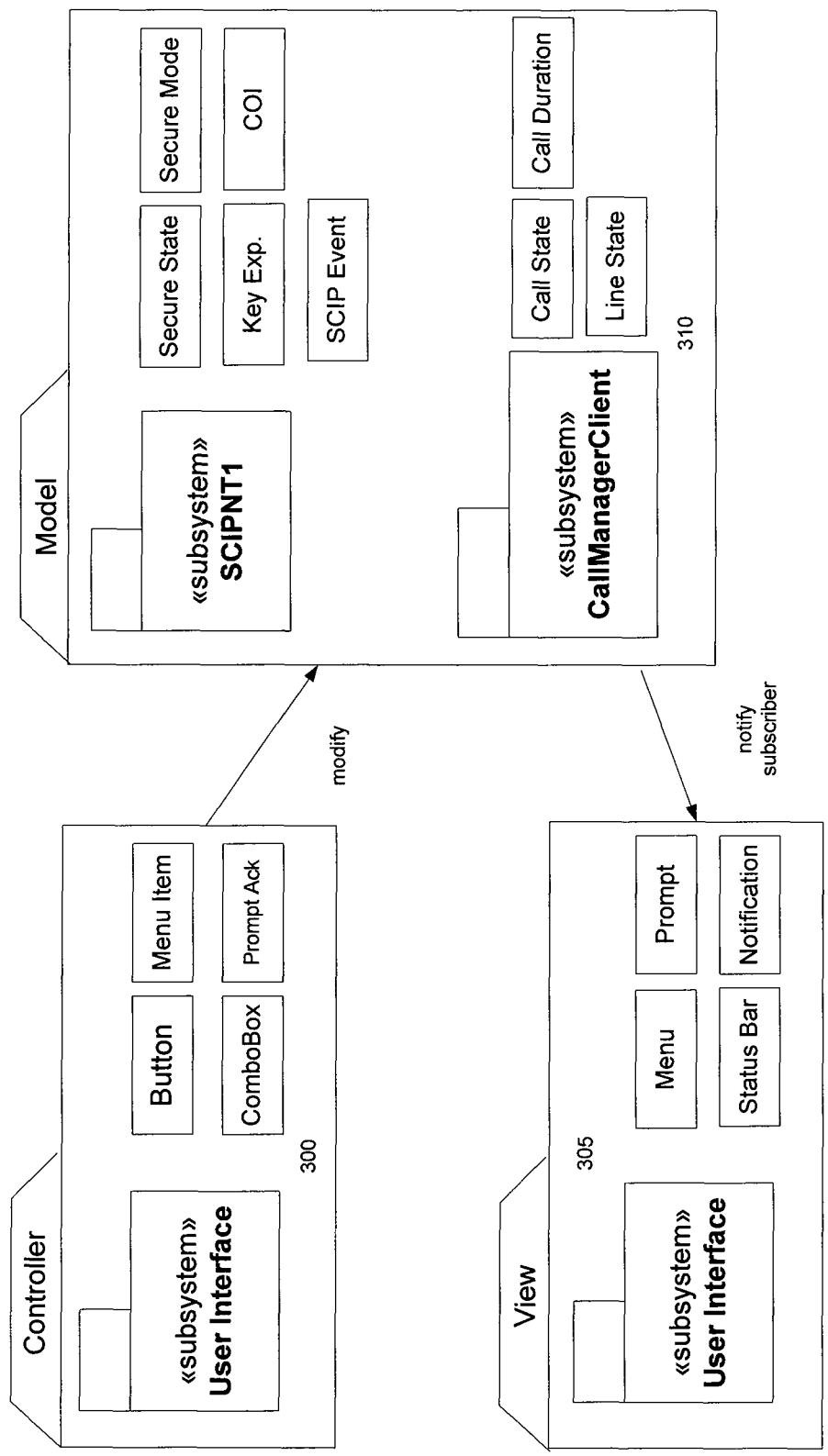
FIG. 3 illustrates an exemplary user interface in accordance with disclosed secure communication framework.

With reference to FIG. 3, the PCSA User Interface Subsystem (UIS) maintains the View elements, which are graphical representations that enable a user to invoke and manage the communications protocols disclosed herein. View elements may consist of menus, dialogs, menu bars, status bars, title bars, and the like. In addition, the UIS may maintain a all or a subset of controller elements, such as buttons, text input, menu selection options, etc. Note that Model elements state changes may occur due to internal events or those received from remote systems. These state changes may in turn trigger notifications to View element subscribers.

Interfacing subsystems, such as the Call Manager Client or SCIP Subsystems, maintain the model aspect and a portion of controller elements as well. Internal state changes to specific solution objects within these subsystems may trigger notifications to the User Interface Subsystem, potentially altering the view contents. Control elements relating to these subsystems may include, for example, internal timer events, call state changes triggered from the remote end, call duration timers, and the like.

The application of the MVC architecture may allow for persistency of the model view elements, being the core voice application elements. A change to the user interface subsystem requires little to no changes in the interfacing subsystem model elements. Additionally, the architecture allows ease of modification to user interface elements, application of new user interfaces or platform changes.

Communications Architecture

The core independent and persistent subsystems are the User Interface, Call Manager Client, SCIP, and the Application Controller Service. Each subsystem is responsible for self initialization, initialization and configuration of dependent modules, and inter-subsystem synchronization through messaging. The Global Software Control/Synchronization details for the PCSA subsystem procedures to enter an operational state and accomplish synchronization for significant system use cases are discussed in greater detail herein.

CSA may rely on the Call Manager Client Subsystem to provide configuration, command, and control messaging to the IP SoftPhone. The IP SoftPhone may be responsible for local audio transformations and management of audio streams. In accordance with various embodiments, the IP SoftPhone provides access to a mobile communications device microphone and speaker through real-time driver access. The Application Controller Service may broker requests on behalf of CSA with the native CSV application.

In an embodiment, the communication architecture may utilize an open layered architecture style for audio flow. The layered approach allows each successive layer to focus on a specific audio transformation such as, for example, audio transformations, encoding and encryption, transport framing, or network transport. The open architecture offers flexibility between accessing successive layers. The IP SoftPhone Subsystem may be configured to pass Clear audio into the SCIP subsystem, which is configured to encode, encrypt, and pass the frames into the MER enabled network transport subsystem. In one embodiment, layer configuration and synchronization to transition between secure and Clear Call paths may require some out of band messaging not depicted in FIG. 3.

Figure 4:
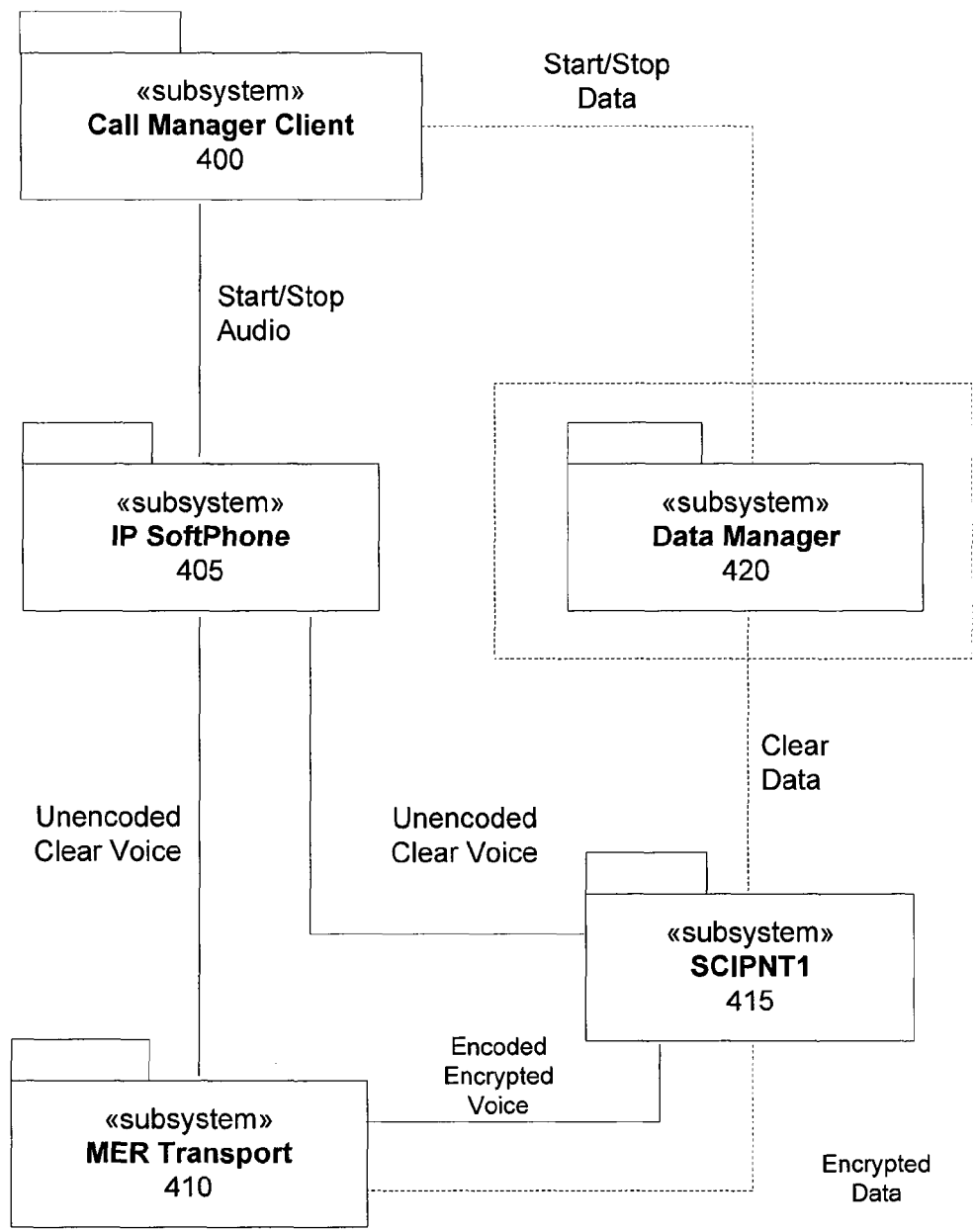
FIG. 4 is a flow diagram illustrating an exemplary secure communication architecture.
Figure 5:
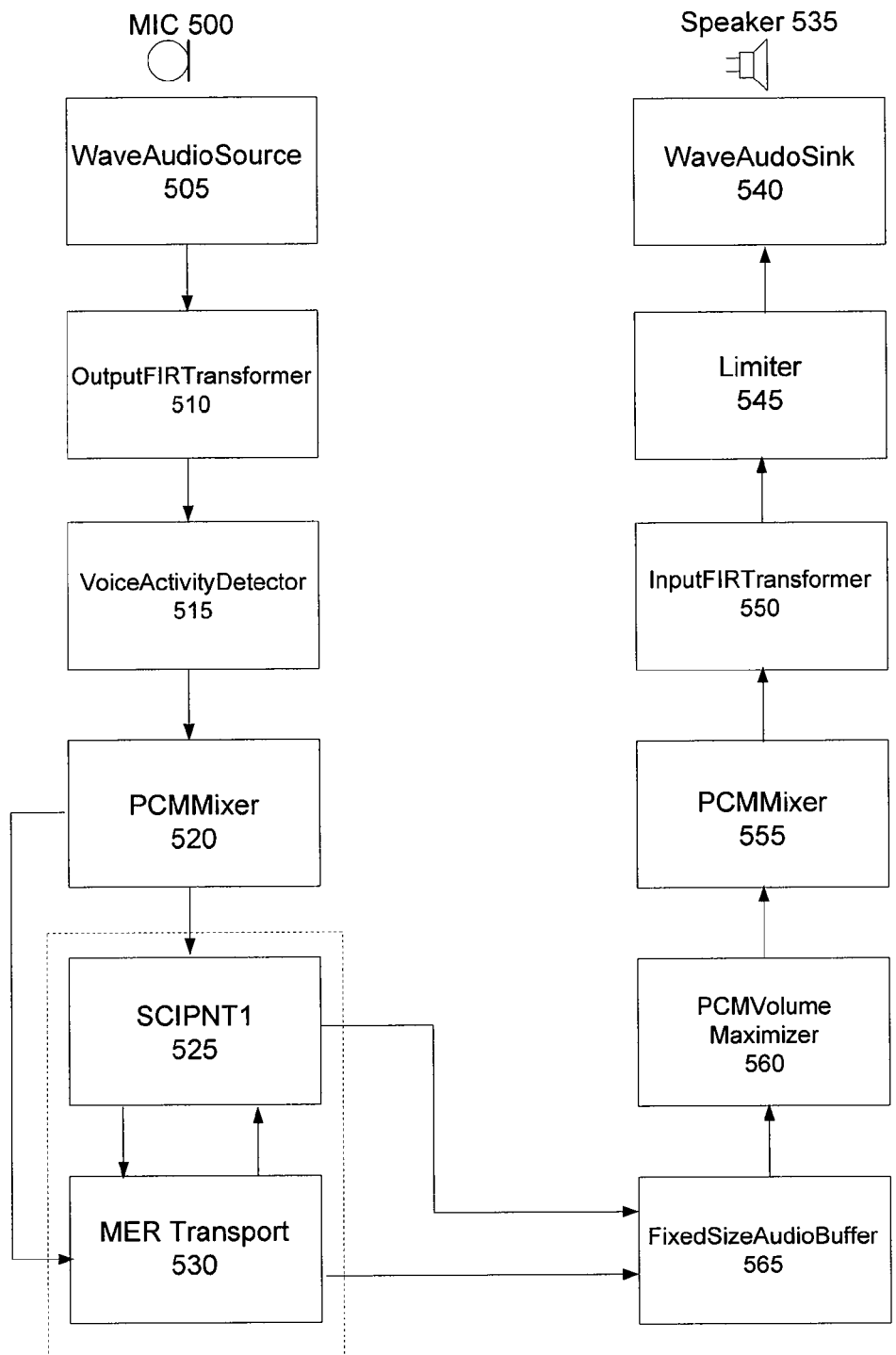
FIG. 5 is a flow diagram illustrating an exemplary SoftPhone communication paths for providing VOIP reliability and quality.
Figure 6:
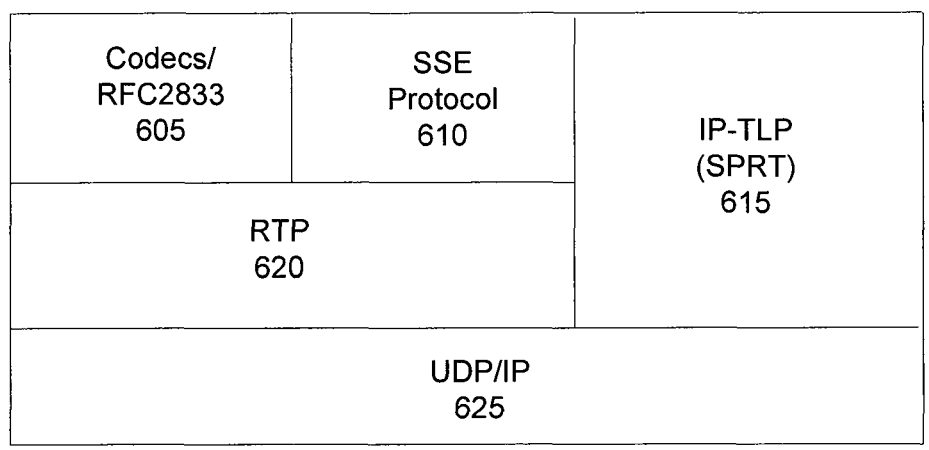
FIG. 6 is a block diagram illustrating an exemplary transport system for encapsulating network protocols and framing.
Figure 7:
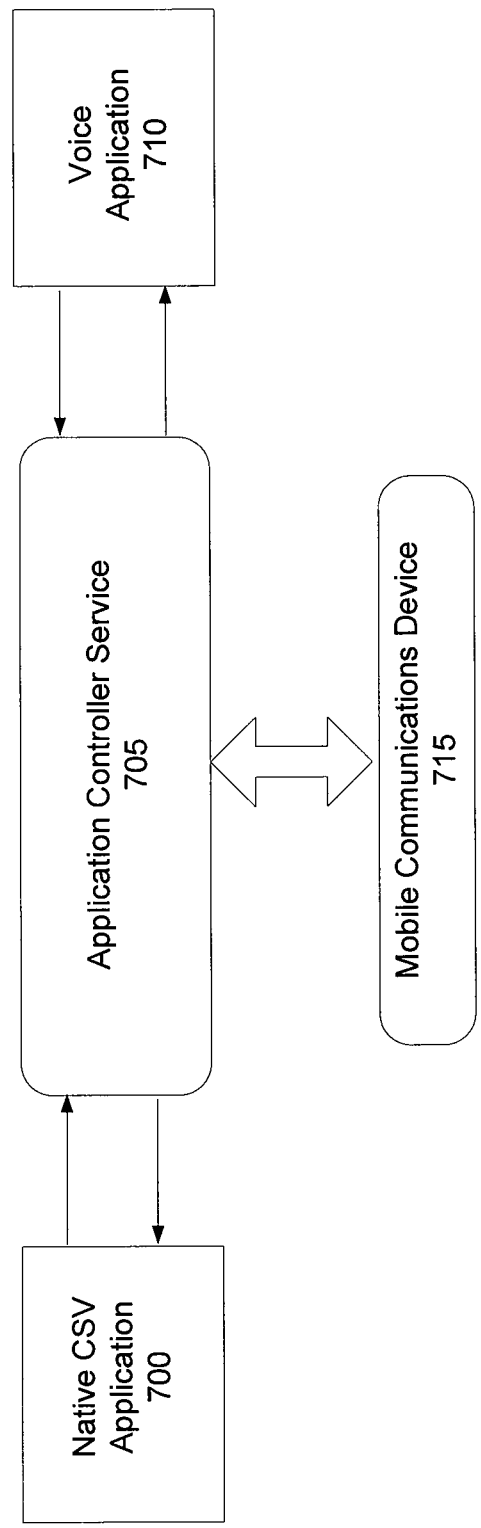
FIG. 7 is a flow diagram illustrating an exemplary Application Service Subsystem (ACSS) for bridging a Circuit Switched Voice (CSV) application and a voice client.

With reference to FIGS. 2 and 4, the User Interface Subsystem (UIS) 215 supports external user interaction with CSA 100 and manages the presentation of CSA 100 data to the user on a remote communications device. UIS 215 interacts with the Call Manager Client 205 and the SCIP subsystems 230 for configuration, status, and control of clear and secure calls.

In one embodiment, the Call Manager Client Subsystem (CMCS) 205 coordinates core VOIP Clear Call setup, maintenance, and transmission responsibilities within CSA 100. CMCS 205 provides the call features, capabilities, and exists as the communication medium with MCEP. Accordingly, CMCS 205 performs call setup signaling, including manual and automated SIP registration requests.

CMCS 205 manages and maintains connections with a Voice Protocol Router (VPR) and Presence Server within MCEP. Moreover, CMCS may control the state and underlying interface of the IP SoftPhone. Messaging between CMCS 205 and the SCIP 230 Subsystems provides synchronization between Clear and Secure Call transitions. Additionally, the UIS 200 may interface with Application Controller Service in order to monitor and control the present state of the native CSV Application.

In one embodiment, SCIP Subsystem 230 manages SCIP messaging and SCIP cryptography for Secure voice. SCIP subsystem 230 receives relevant events such as key presses and user input from the User Interface and reports defined state changes to the User Interface Subsystem for user view. Additionally, messaging with Call Manager Client 205 may provide synchronization between Clear and Secure Call transitions. Relevant state changes within the SCIP module 230 are reported to the User Interface for user notification. SCIP encoded voice and data are transmitted through the SCIP MER enabled Network Transport module 215, which may be configured and managed by Call Manager Client 205.

IP SoftPhone Subsystem 220 may be configured to manage core SoftPhone functionality. For example, when a SoftPhone receives audio from the microphone, it transmits audio to the speaker via the software interface to the Windows real-time libraries. Internal functionality may include, for example, jitter buffering, echo cancellation, volume maximization, mixing, transforms, limiting, playing the wave output, and the like. IP SoftPhone 220 may further support a static or dynamic jitter buffering methodology. The dynamic jitter buffer may be tailored to accumulate a specific duration of voice, tailored for platform performance.

IP SoftPhone 220 may be further configured to transmit and receive audio frames to and from the underlying subsystem, which is determined by the current call state, namely, Clear or Secure. The state of this interface may be established through message synchronization between Call Manager Client 205 and the SCIP 230 Subsystems. During transitions to Secure Calls, the IP SoftPhone data paths may be directed toward the SCIP Subsystem 230, where Clear voice frames may be transmitted to the SCIP module.

In one embodiment, the MER Transport Subsystem 215 encapsulates the CSA 100 network transport protocols and framing away from higher layer CSA 100 modules. All Modem over IP (MOIP) operations, dictated by SCIP, are supported in this layer. The MER transport 215 may support, for example, Real-time Transport Protocol (RTP), State Signaling Event (SSE), and Simple Packet Relay Transport (SPRT) protocols.

The Application Controller Service Subsystem (ACSS) 210 acts as a bridge between the Windows Mobile native CSV application and the CSA voice client. ACSS 210 permits use of the native CSV call features in parallel with the PCSA voice capabilities. ACSS 210 monitors call and line states of both native CSV and PCSA applications.

CSA may verify with ACSS 210 before initiating and accepting calls or attempting to transition into a Secure Call state. Similarly, ACSS 210 may control the call states of the native CSV application with respect to the present CSA call states and requests upon its behalf.

The Secure Messaging Framework Subsystem (ASMF) 225 may be configured to provide a variety of core services to both CSA voice clients. The services may include, for example, access to the crypto module, device management, security policy management, talk transport, CSPWare, certificate stores, Guard, and Data at Rest Encryption (DAR).

Figure 8:
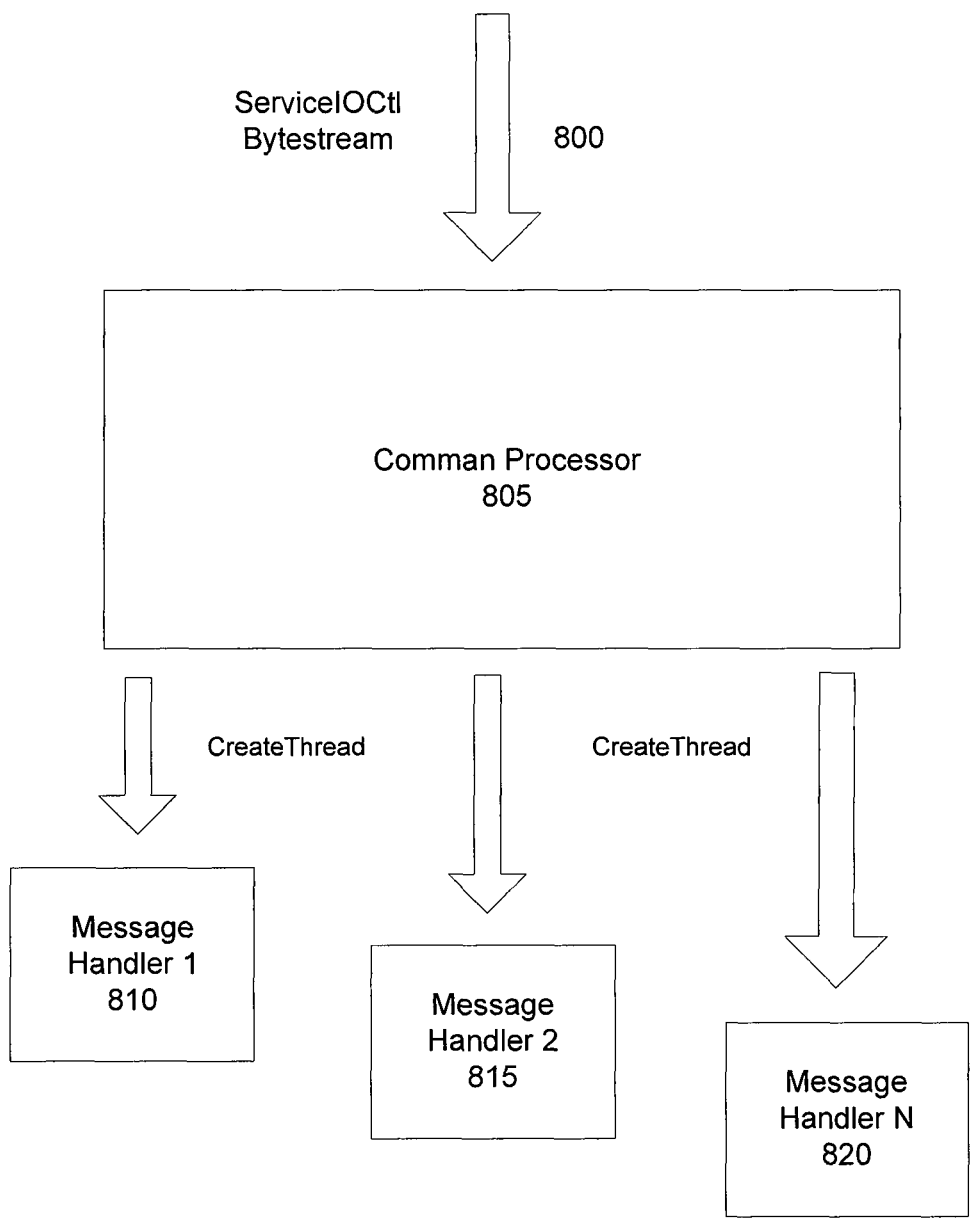
FIG. 8 is a flow diagram illustrating exemplary subsystem interface message control and synchronization.

In one embodiment, the various subsystems within CSA, as disclosed herein, communicate between message interfaces using defined messages. The model may support modularity and decoupling between the modules within CSA. The message interfaces may utilize a thread model, which allows for concurrent message handling and enhanced performance. The message handlers specific to each subsystem or software module may be responsible for shared access to resources and internal synchronization. FIG. 8 illustrates an example of such thread based message handling in accordance with one embodiment of the invention.

Figure 9:
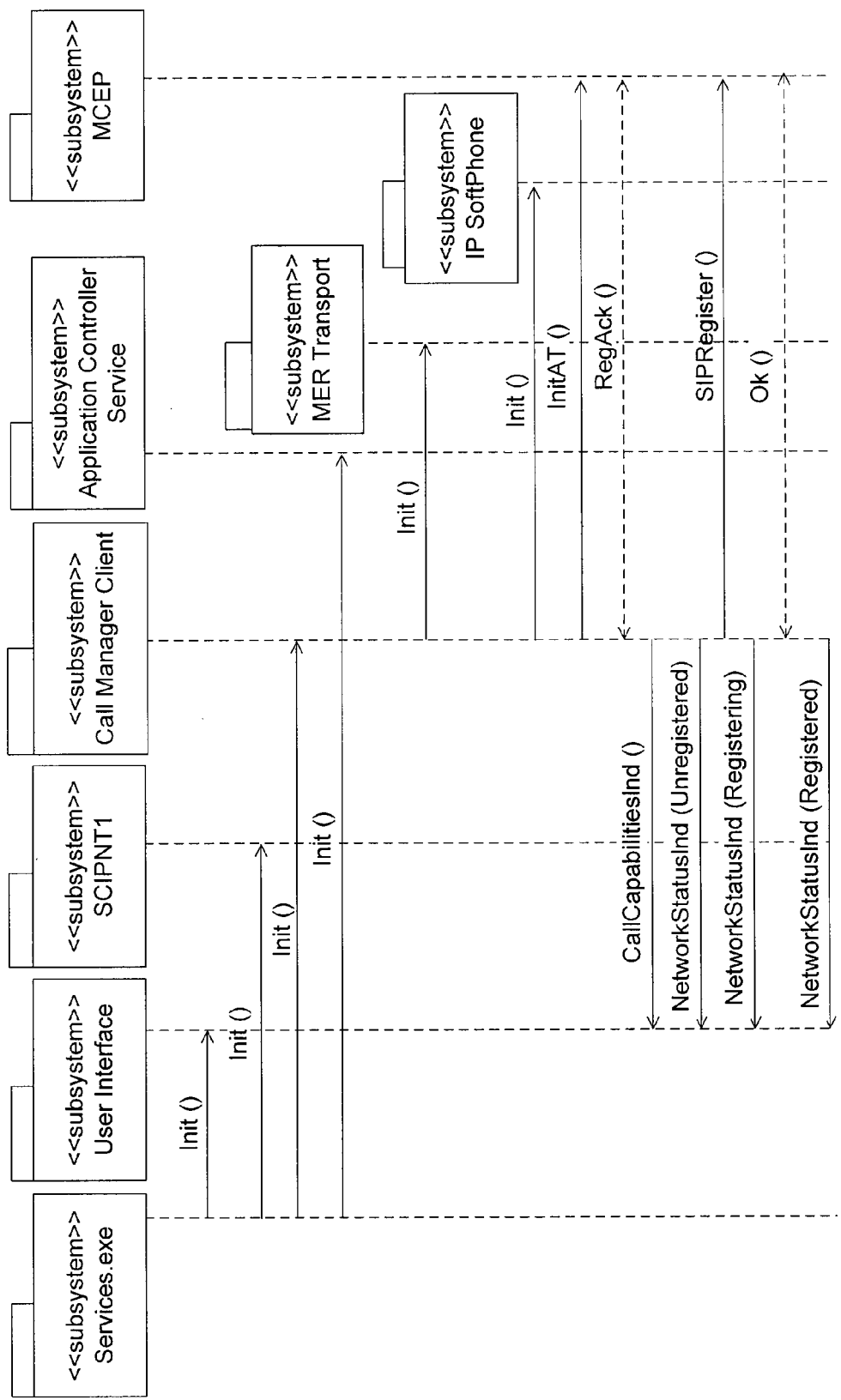
FIG. 9 is a flow diagram illustrating an exemplary messaging structure for secure communication initiation and control.

FIG. 9 depicts the messaging required to bring CSA into a state capable of call initiation or reception, where registration may occur with both the MCEP and the SIP Server. In accordance with the example flow presented in FIG. 9, four Mobile Services, the User Interface, SCIP, Call Manager Client, and the Application Controller Service, are created and initialized by a Mobile kernel process Services.exe. However, practitioners will appreciate that various operating systems may initialize these, and similar, services using a variety of protocols in accordance with the specific architecture of the mobile communications device.

Figure 10:
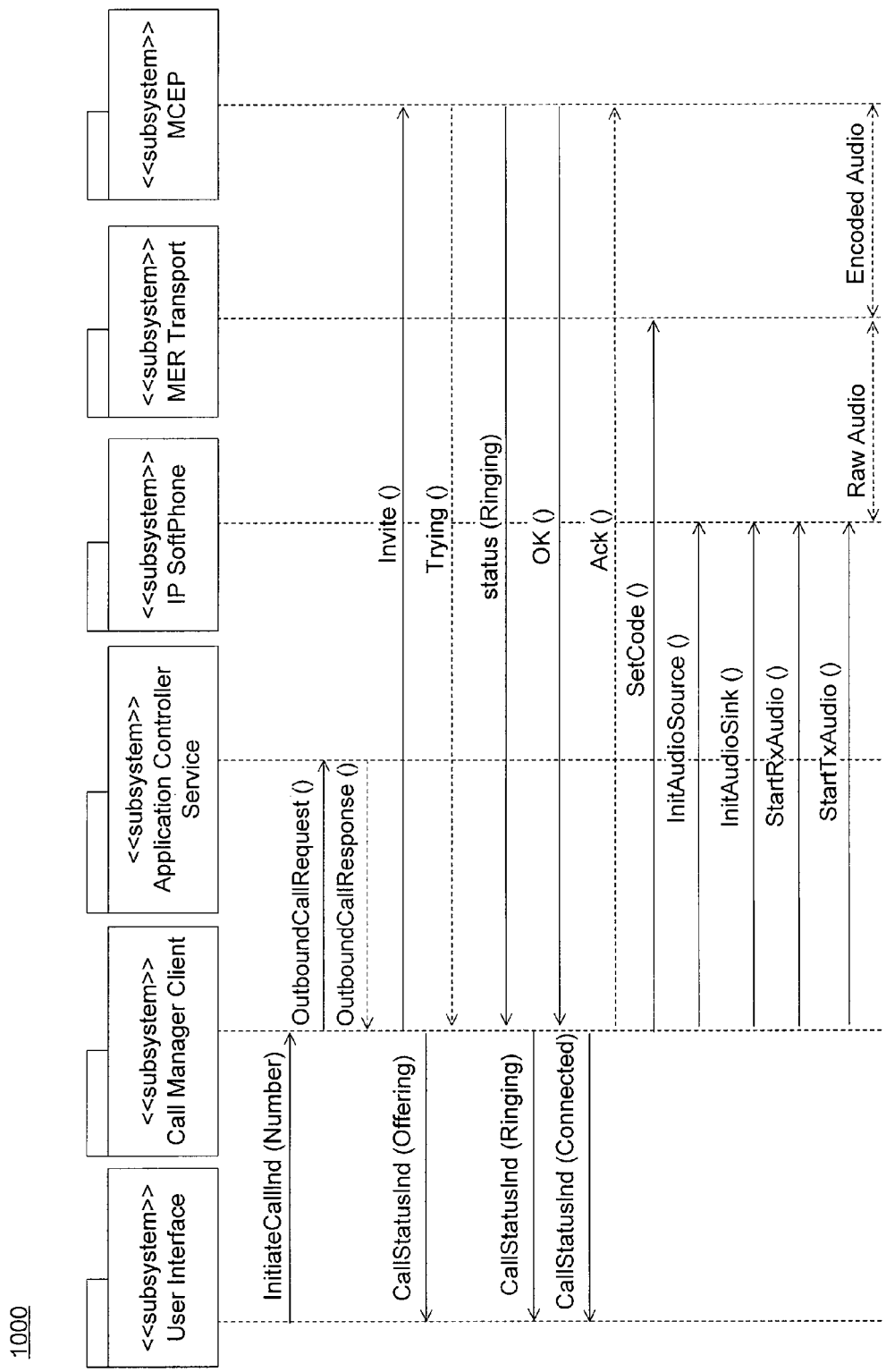
FIG. 10 is a flow diagram illustrating an exemplary message flow for providing Clear Call initiated from a secure mobile communications device User interface (UI)

FIG. 10 illustrates a message flow for a Clear Call initiated from the CSA User Interface Subsystem. The CSA Call Manager Client utilizes SIP messaging to perform call establishment with the SIP server within the MCEP. Upon call connection, raw audio frames are passed from the IP SoftPhone into the MER Transport. The MER transport provides encoding and packetization into RTP/UDP. Lastly, the encoded audio frames are transferred to/from the CSA client and the MCEP.

Figure 11:
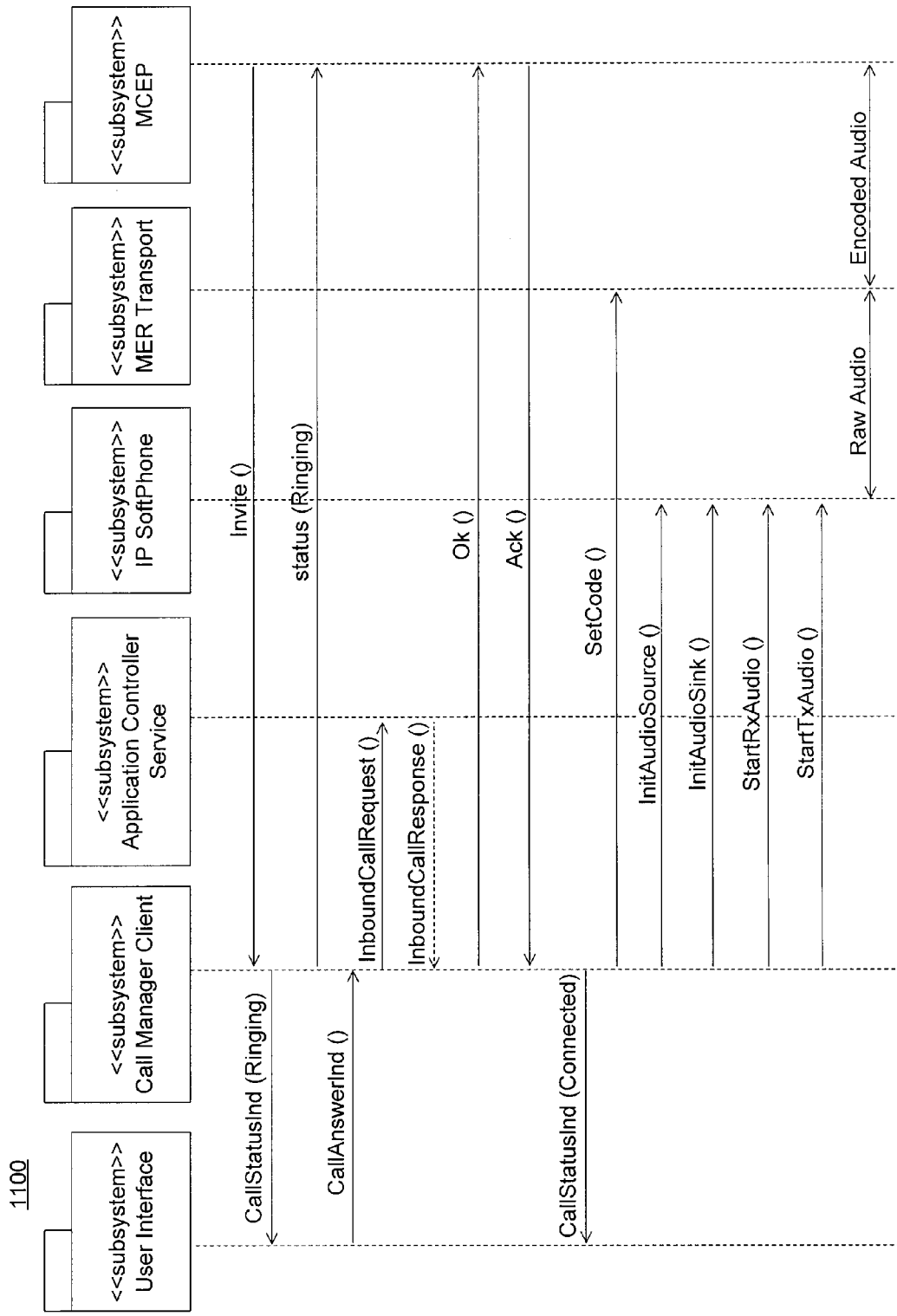
FIG. 11 is a flow diagram illustrating an exemplary message flow for providing Clear Call received from a second a secure mobile communications device.

FIG. 11 illustrates a message flow for a Clear Call received from another VOIP handset via the MCEP. Similar to call initiation, the CSA Call Manager Client utilizes SIP messaging to establish the call with the SIP server within the MCEP. Similarly, upon call connection, raw audio frames are passed from the IP SoftPhone into the MER Transport. In one embodiment, the MER transport provides encoding and packetization into RTP/UDP. Moreover, the encoded audio frames may be transferred to and from the CSA client and MCEP.

Figure 12:
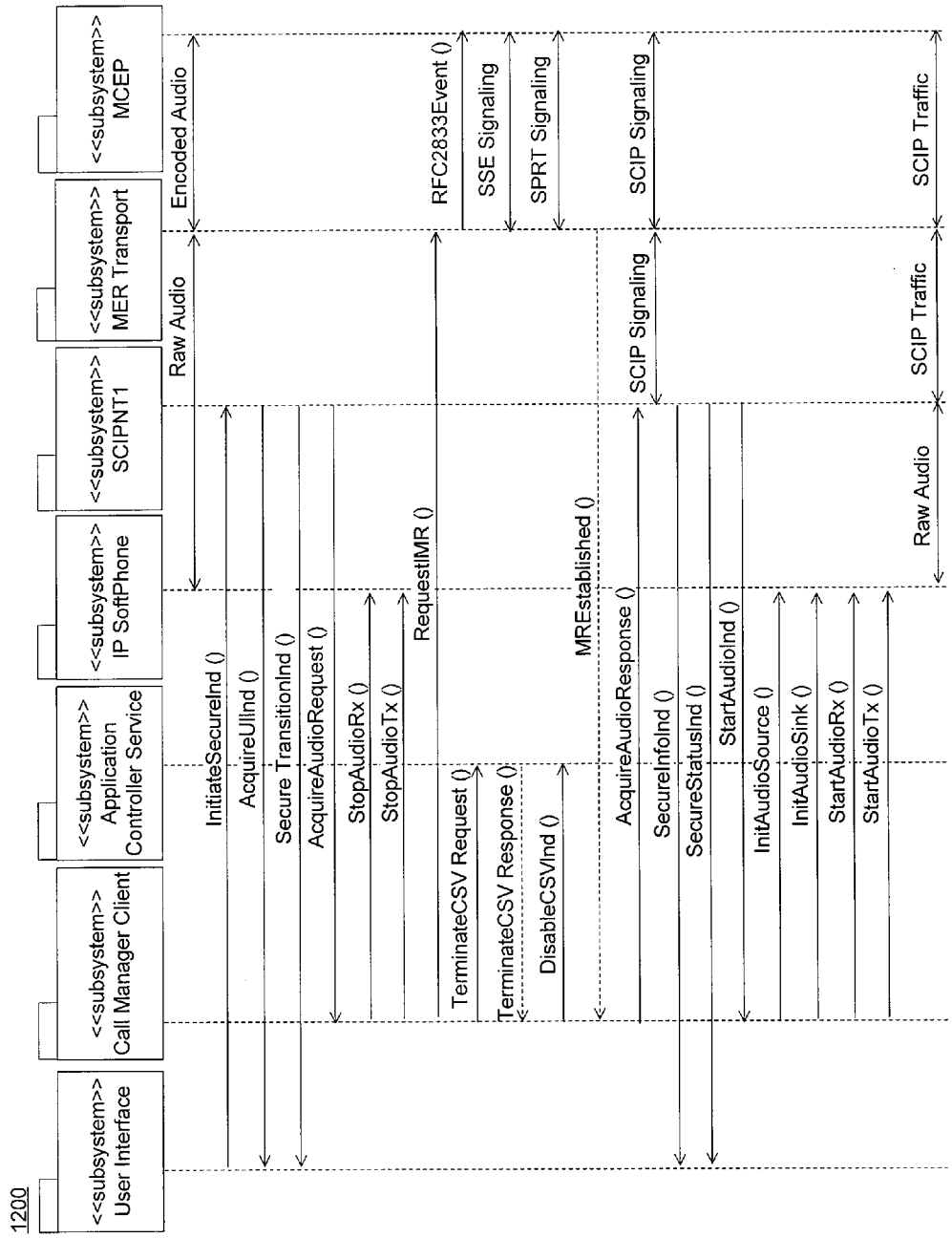
FIG. 12 is a flow diagram illustrating an exemplary message flow for transitioning a Clear signal from a mobile communication device signal into a SCIP Secure Call.

FIG. 12 illustrates a message flow for the transition of a Clear CSA VOIP call into a SCIP Secure Call. In accordance with this embodiment, data traverses MCEP or otherwise referred to as a Network Operations Center to maintain integrity of the end to end connection, should carrier IP addresses change.

For more information about the MCEP or Network Operations Center, see U.S. patent application Ser. Nos. 12/553,937, 12/553,947 and 12/553,950 entitled "Method and System for Communicating Fixed IP Address Based Voice Data in a Dynamic IP Address Based Network Environment" which are hereby incorporated by reference.

Figure 13:
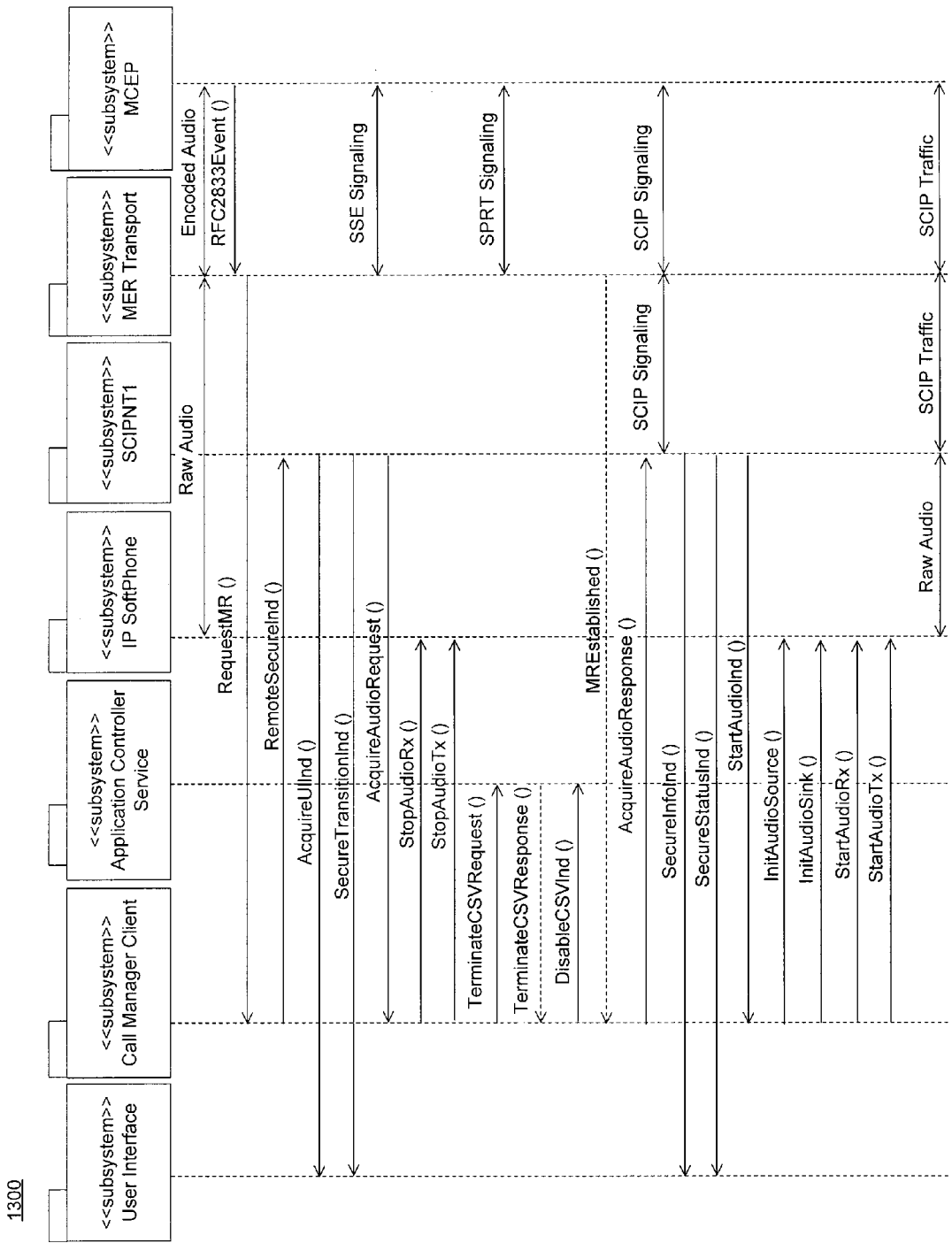
FIG. 13 is a flow diagram illustrating an exemplary message flow for transitioning a Clear signal from a mobile communication device signal into a SCIP Secure Call.

FIG. 13 illustrates a message flow for the transition of a Clear CSA VOIP call into a SCIP Secure Call, initiated from the Remote endpoint. Similarly, all data traverses the MCEP to maintain integrity of the end to end connection, should carrier IP addresses change.

Figure 14:
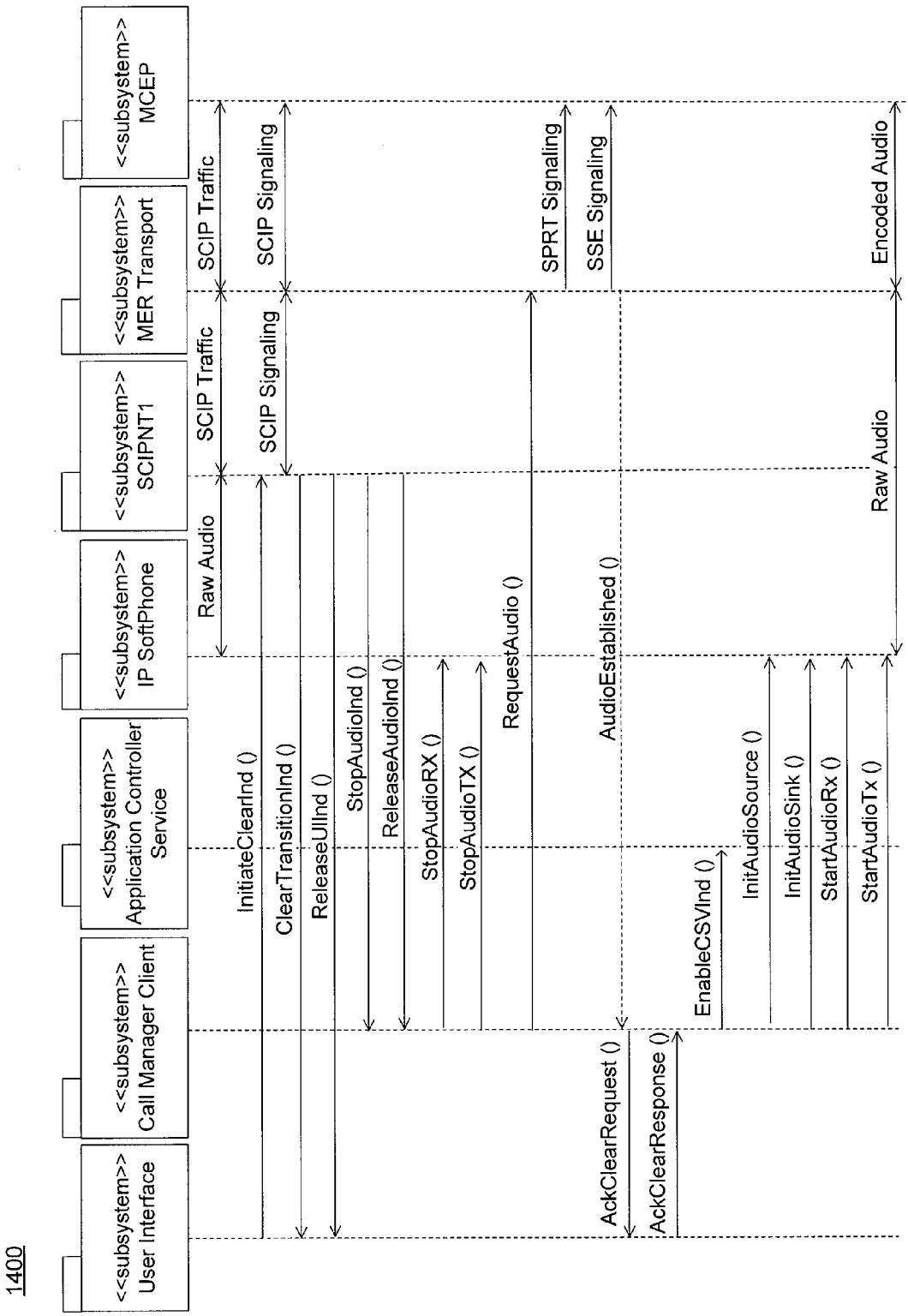
FIG. 14 is a flow diagram illustrating an exemplary message flow for transitioning a secure signal from a mobile communication device a locally initiated Clear VOIP signal.

FIG. 14 illustrates a message flow for the transition of a Secure CSA call into a Clear VOIP call, initiated locally. Similarly, all data may traverse MCEP to maintain integrity of the end to end connection, should carrier IP addresses change.

Figure 15:
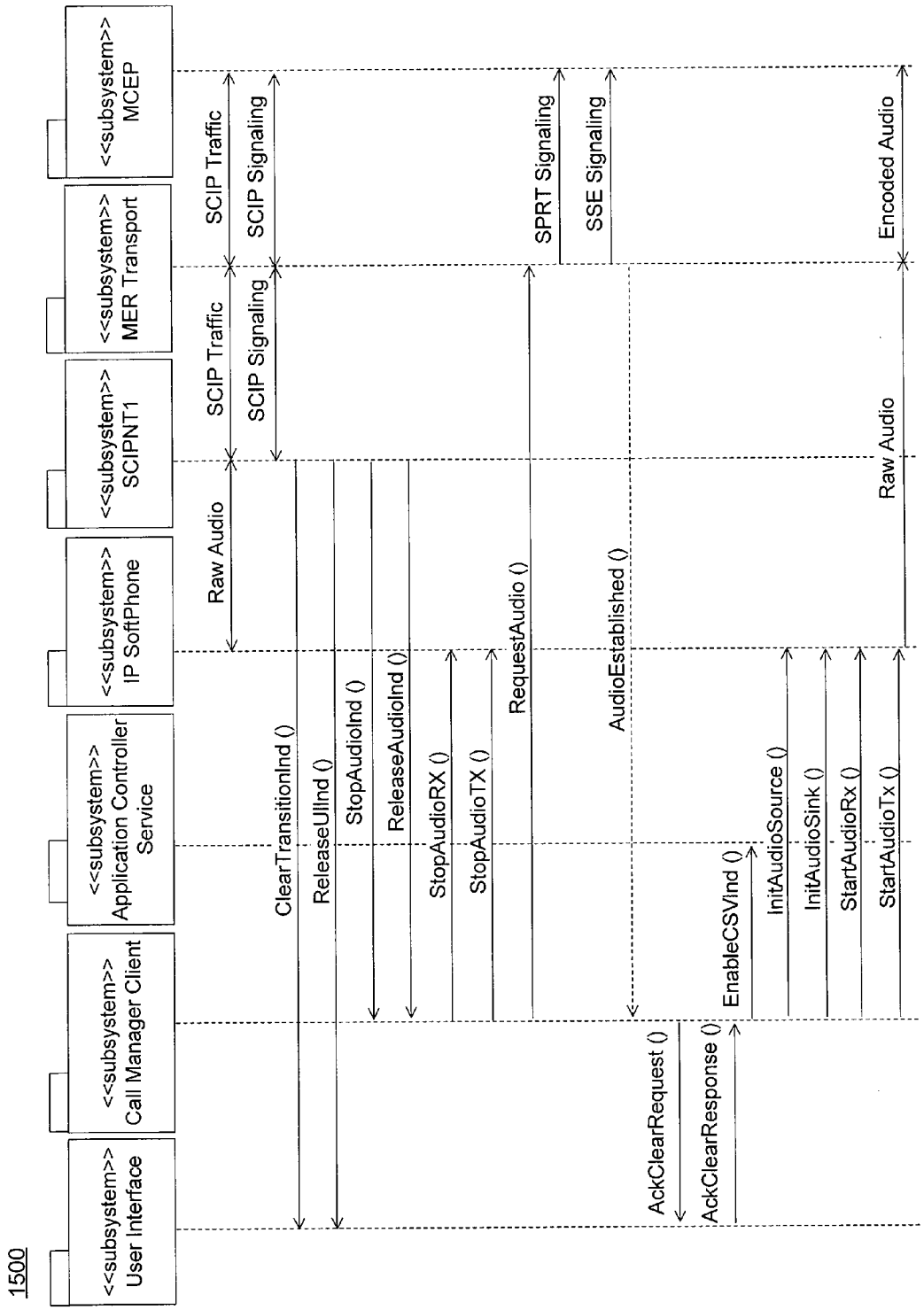
FIG. 15 is a flow diagram illustrating an exemplary message flow for transitioning a Clear signal from a mobile communication device signal into a SCIP Secure Call initiated from a Remote endpoint.

FIG. 15 illustrates a message flow for the transition of a Secure CSA call into a Clear VOIP call, initiated from the Remote endpoint. Similarly, all data may traverse MCEP to maintain integrity of the end to end connection, should career IP addresses change.

In one embodiment, CSA software entities may be signed by a third party code signer. The validity and integrity of each module may be verified prior to execution on the mobile client. However, the Secure Messaging Framework may provide the necessary utilities to provide a majority of the authentication, access control, and integrity mechanisms required for CSA. The Guard module may be integrated in order to provide authentication and access control into CSA features. DAR and certificate stores may also be provided by the Secure Messaging Framework and could be extended to provide potential key management services.

System Architecture

Figure 16:
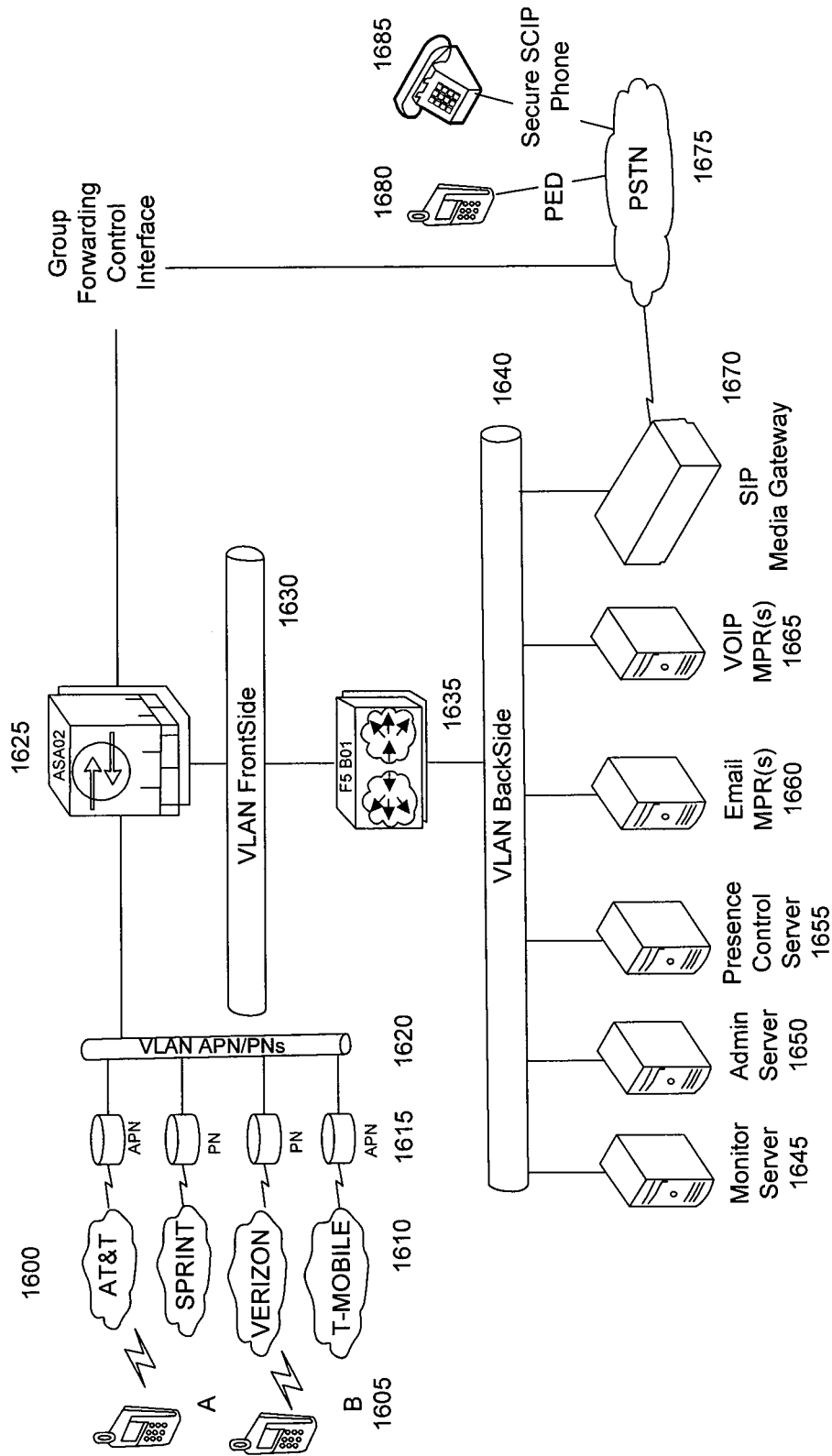
FIG. 16 is a block diagram illustrating an exemplary architecture for initiating receiving, and maintaining secure VOIP signals.

With reference to FIG. 16, core components of the CSA System are presented to allow those of ordinary skill in the art to appreciate the scope of the invention and to provide a basis for understanding the core functionality and objectives of the invention. However, is should be understood that any number of configurations, combinations of components, combination of components, use of existing components, and custom components may be arranged in order to facilitate the objectives of the present invention.

In one embodiment, the CSA 100 System Architecture may comprise elements to initiate, receive, and maintain Clear and Secure VOIP calls and send and receive Clear and Secure email from a CSA 100 client. FIG. 16 depicts core elements within the system architecture required to communicate and enable the CSA 100 client with voice and data capability. In accordance with this embodiment, design effort has been made to leverage as much of the existing MCEP design technology in order to support new and existing features for Clear and Secure VOIP.

Accordingly, this architecture permits CSA 100 mobile clients to communicate Clear and Secure voice to a wide array of IP and Time Division Multiplexing (TDM) endpoints. In one embodiment, the Half Duplex (HDX) Media Gateway and Call Manager components exist as one physical entity but are logically distinct from a communication standpoint.

Figure 17:
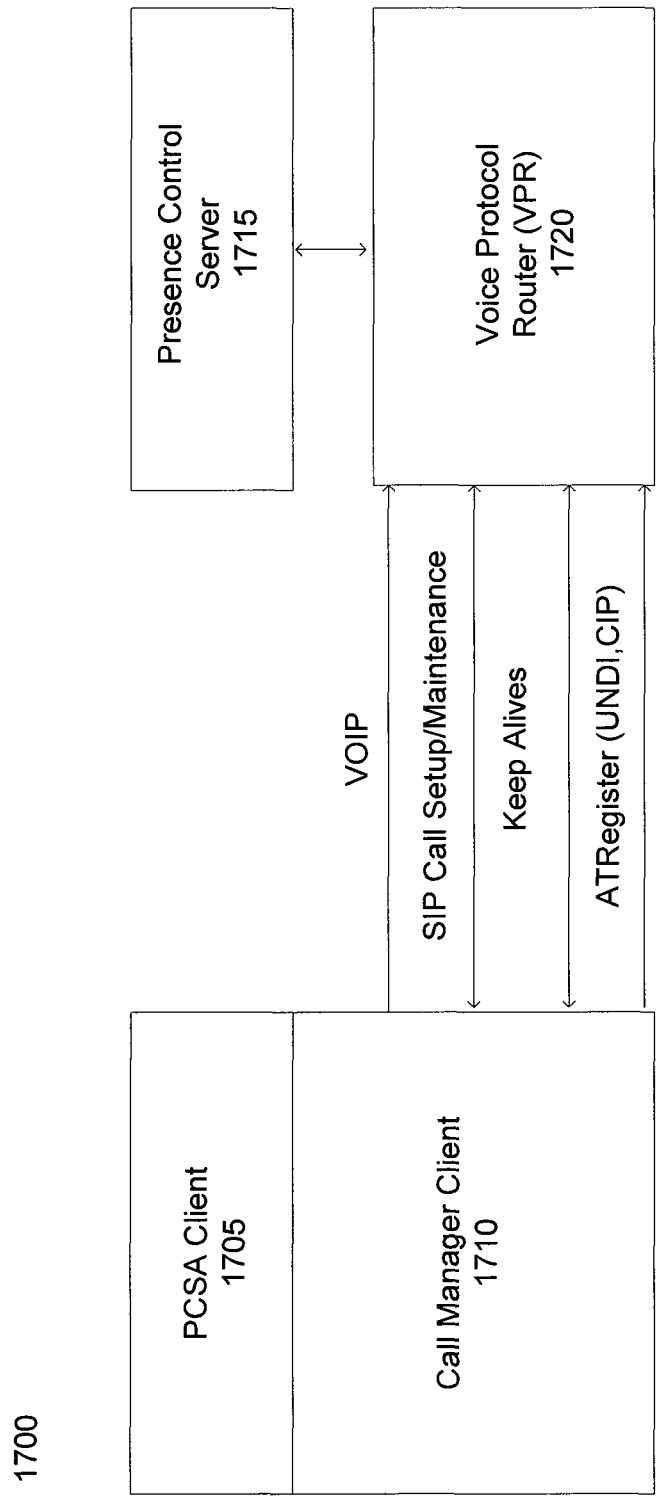
FIG. 17 is a flow diagram illustrating an exemplary signal processing for a persistent service executing within a mobile communications device.
Figure 18:
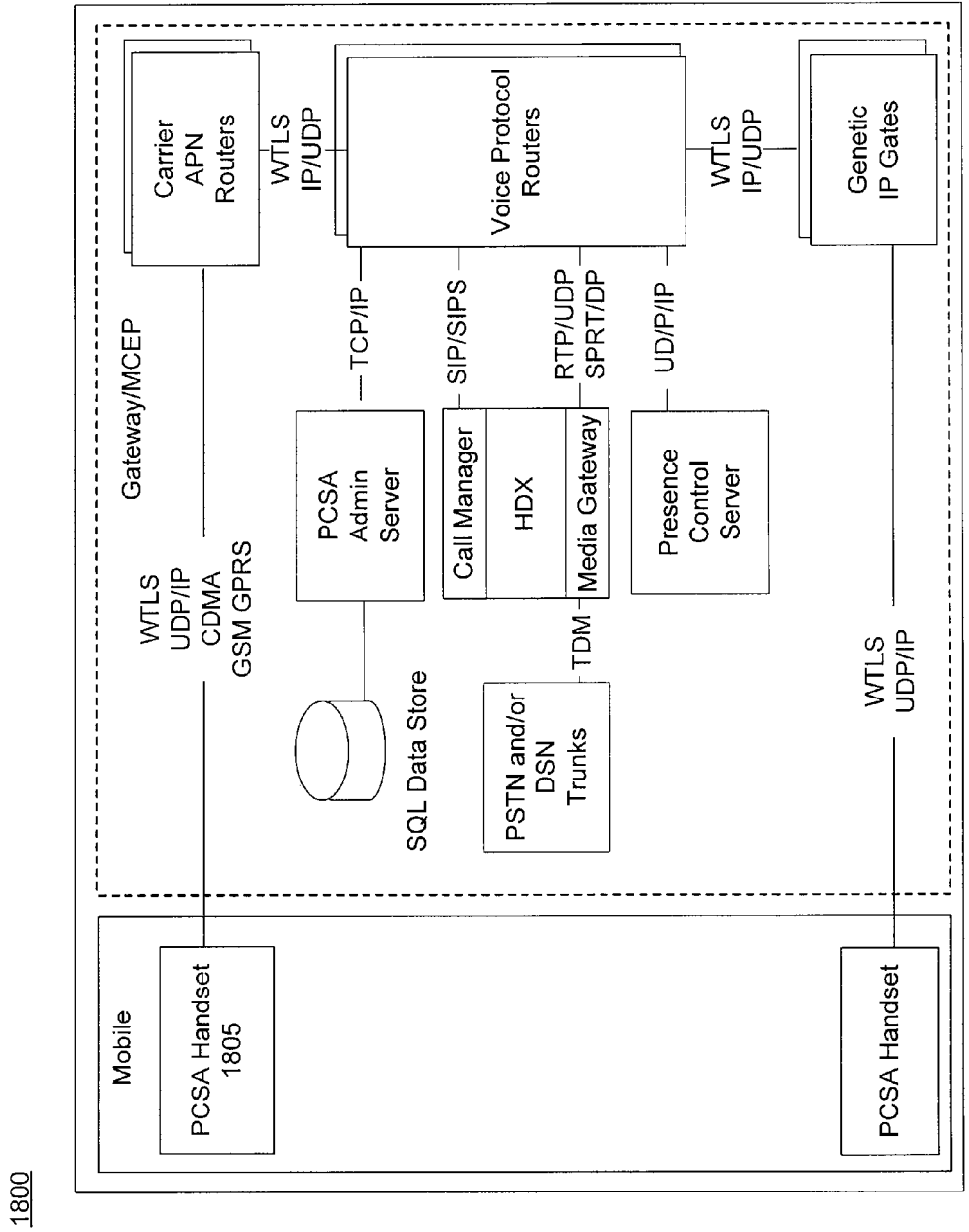
FIG. 18 is a block diagram illustrating an exemplary architecture for a Multi-Carrier Entry Point (MCEP) to enable communication setup, communication path, media translation, and administration.

Additions to the Gateway may include, for example, a Voice Protocol Router (VPR), Presence Control Server (PCS), and HDX. In one embodiment, the VPR is a voice specific router providing Network Access Translation (NAT) support for dynamic carrier IP assignment, similar to that provided by the Multi Protocol Router (MPR) for email. The initial functionality of the PCS provides "keep-alive" support to CSA 100 handsets for presence status. The HDX Call Manager offers full SIP support for call setup and maintenance. Moreover, the HDX Media Gateway provides V.150.1 and full IP termination support for Defense Switched Network (DSN) interface. Policy extensions to the present Administration Server may be required in support of CSA 100 VOIP clients. Each of the core system elements illustrated in FIG. 16 are described in further detail below in reference to FIG. 17.

The CSA 100 mobile clients are Global System for Mobile Communications (GSM), Code Division Multiple Access (CDMA) enabled Commercial Off the Shelf (COTS) PDA devices. In accordance with this embodiment, each mobile client supports secure messaging, Clear VOIP, and SCIP enabled secure VOIP. The Call Manager Client module, as described in greater detail below, supports MCEP communication and functionality to achieve the objectives presented herein.

The Call Manager Client is a persistent service executing within the CSA 100 client. Prior to call setup and maintenance support with the HDX Call Manager, the client is first responsible for Talk registration with the VPR. The VPR registration updates the router with the device's static Unique Network Device Identifier (UNDI) and currently assigned carrier IP (CIP). The fronting VPR provides NAT support for dynamic CIP to Voice IP (VIP) changes that may occur at any given instant in the operating environment. The VIP may be the voice counterpart of the Cipher Text IP (CTIP) used for High Assurance Internet Protocol Encryptor (HAIPE).

In accordance with one embodiment, a CSA 100 mobile client may be required to be registered with the MCEP as a valid handset before the CSA 100 client may initiate or receive voice calls. The initial device registration may utilize, for example, generic Talk messaging for registration, which is protected, for example, under the Wireless Transport Layer Security (WLTS) using AES256 encryption.

In addition to call setup, call maintenance, and VPR device registration, the Call Manager Client may respond to "keep-alive" requests received from the PCS. The "keep-alive" responses support client presence awareness received from the MCEP.

In order to provide authentication, confidentiality, and data integrity of the call control plane, the Call Manager Client may support Transport Layer Security (TLS), for example. The addition, TLS may provide authentication of the SIP Server, while ensuring that all SIP call control and maintenance messaging remains confidential between the CSA 100 client and the Call Manager. Call control traffic may use a distinct TCP/IP channel in accordance with the protocol parameters of TLS, but traffic may be encapsulated within the network stack. The encapsulation may support the dynamic IP management for the call control plane.

The core Gateway, also known as the Multi-Carrier Entry Point (MCEP), may be leveraged and extended to support CSA 100 voice features including call setup, call path, media translation, and administration. Additions to the gateway may include a HDX switch and PCS. The HDX includes capabilities for media gateway, V.150.1 gateway, and SIP call management support.

According to one embodiment, the HDX is a class 4/5 softswitch with SIP call management and media gateway capability, supporting IP and TDM interoperability. Thus, full IP termination of CSA VOIP is provided and support interoperability with the DSN. Moreover the HDX media gateway should be SCIP MER compliant. Moreover, CSA Secure VOIP paths are routed via the MER Gateway for establishment of digital channels across the DSN, which support secure communication with SCIP digital terminals inside the DSN and over the PSTN.

The HDX Call Manager module may provide full SIP support for call setup and maintenance of PCSA voice calls. The call manager is distinctly addressable and leverages TRANSIP technology, for example. Additionally, the Call Manager may support Transport Layer Security (TLS), which may provide call control plane security with the PCSA clients.

The Voice Protocol Router (VPR) is configured to support carrier IP network address translation on behalf of the CSA client. The VPR may be tailored to meet the demands and requirements of VOIP, including high performance processing and low latency of call paths, for example.

The PCS may be configured to monitor presence of the CSA 100 clients allocated to a particular MCEP. In order to determine presence status, the PCS may transmit "keep-alive" messages to CSA 100 end clients at regular intervals. Moreover, the PCS may use the presence information to assist in failover procedures with a redundant data site. The PCS also supports the addition of future control plane services within the MCEP.

The Administration Server may be extended to provide support for authorized voice enabled handsets. The server is tasked with monitoring and management of dynamic CSA client registration, provisioning, and audit logging. The Administration Server is further configured to broadcast ZeroConf messages to provide configuration changes and event reporting to the set of Voice Protocol Routers.

The load balancer configuration may be changed to grant all, or a subset, of VOIP traffic the highest priority. In addition, the load balancer may route VOIP packets to the VPRs, balance the load between multiple VPRs, and monitor VPR status for the local failover.

The HDX Media Gateway and Call Manager components may be included as an off the shelf third-party hardware component. As stated previously, although the two components may be physically connected, they may be treated as logically separated entities from the communications view.

The VPR may include an extension of the present MPR into a high performance and low latency operating environment tailored to voice. Software and hardware changes may be incurred to the present MPR design.

Addition of the PCS Server may include additional hardware server/s within the MCEP locale. At present, the allocated software development to the PCS Server includes an interface for VPR control and for transmission of "keep-alive" functions en route to the end client.

In accordance with one embodiment, MCEP is configured to facilitate physical access protection and video monitoring. Access Controls including administrative username and login may be required to add authorized device's into the MCEP Administration Server. Access into all of the HDX components is already protected by a username and password for authentication.

Figure 19:
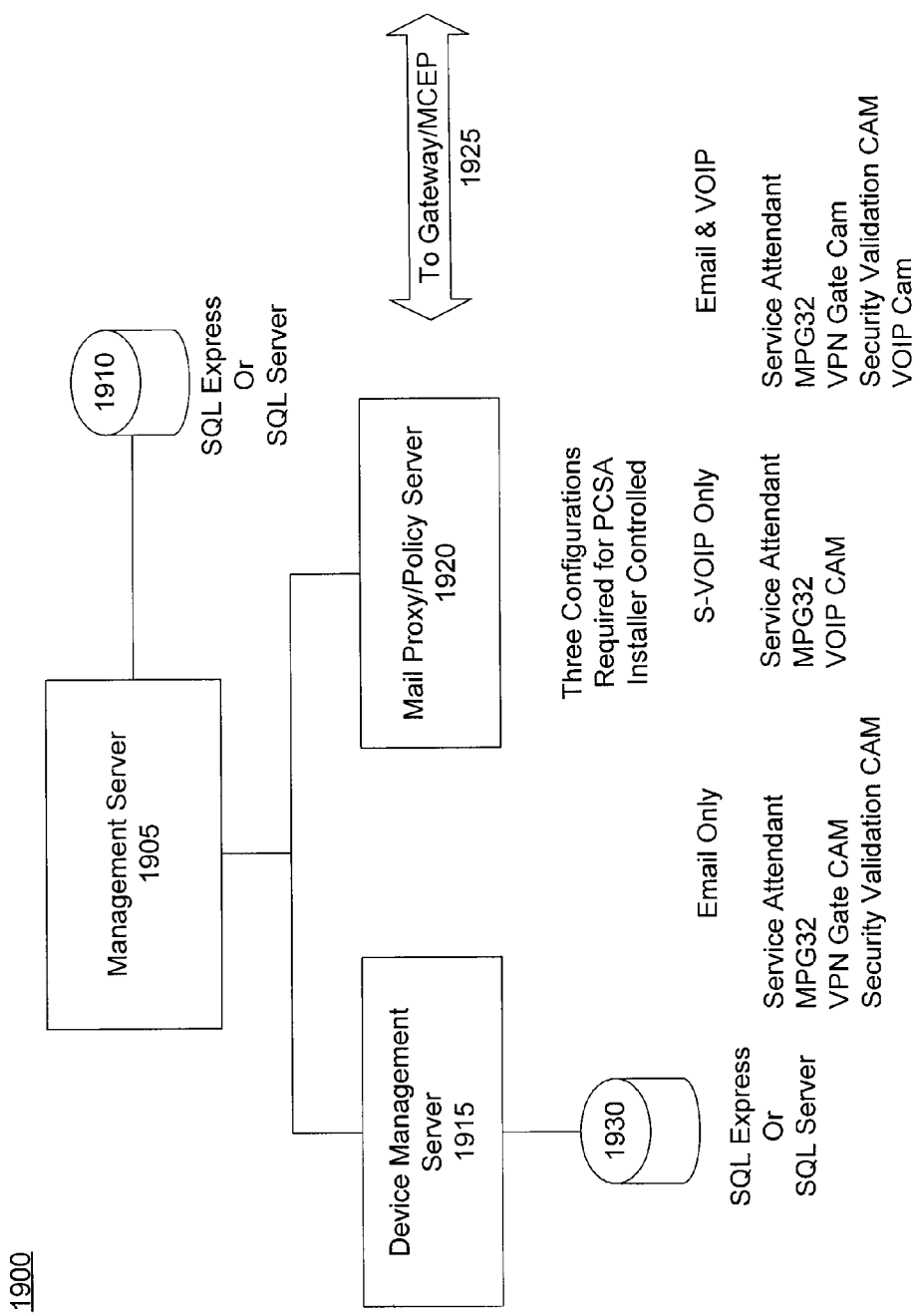
FIG. 19 is a block diagram illustrating an exemplary architecture for performing policy and device management for voice communications.

A customer Enclave may be extended to support policy and device management for client voice only or voice and email solutions. FIG. 19 illustrates extensions and modifications to the present Enclave management required for integration of voice. Similar to procedures for email, voice specific policies may be pushed to the handsets via the Gateway.

Management of toll numbers, VOIP stations, and dial plans may be levied upon the management of the softswitch located in the Gateway. DiffServ (DS) based service provisioning policies may be implemented and controlled by network administrators at the Gateway. Service differentiation may be granted to VOIP frames, designated in a DS field in the IP frame. CSA 100 clients may be provisioned with associated priority levels for packet tagging.

The SMF, located on each client device, may be responsible for receiving and enforcing the policy items received from the Management Server. Examples of such policy items include, SIP Server IP Addresses and Ports, SDP Description, Media Gateway IP Address and Port, Station Number, Voice IP (VIP), Enabled Call Capabilities (Lines, Forwarding, Conference, Transfer, Precedence, Voicemail), and DS Voice Packet Priorities.

The network infrastructure may consider a differentiated services enabled network. Service provision policies may be allocated to VOIP traffic streams, which govern how the traffic may be forwarded within the Apriva VLANs. Service Level Agreements (SLAs) with specific carriers is outside the scope of this section.

Differentiated Services, or DS, specifies a mechanism for classifying and managing a network traffic stream, providing a class based level of QoS for the associated traffic stream within the network. As used herein, a "Service" may define characteristics of packet transmission in one direction across a set of one more paths within a network. The service policy may include, for example, the quality of service allocated to a particular traffic aggregate, the per-hop behaviors used to realize the services, the DS field value or DS codepoint used to mark packets, the actual implementation applied to realize the Per-Hop Behaviors (PHB), and the like.

In one embodiment, Expedited Forwarding (EF) PHB may be implemented for the DS Code Point in the IPv4 TOS field for VOIP packets. Expedited Forwarding PHB offers a low loss, low delay, and low jitter service to a traffic class, which may be useful for VOIP and other real-time media. Accordingly, network routers may be enabled to handle the EF PHB packet class.

Multilevel Precedence and Preemption (MLPP) service enables execution of priority communications at the remote communications device. Authorized users may preempt lower priority communications with high priority communications in situations of network stress or emergency.

Existing MCEP technology may be implemented within the invention in order to provide additional features to CSA 100 VOIP applications. One such feature may include, for example, providing an ability to maintain point-to-point data connections during dynamic changes of the carrier IP address. This dynamic IP management supports high availability and maintenance of the call and control path across carrier IP address changes. Such added functionality is accomplished through integration of the enhanced MPR, namely the VPR.

Figure 20:
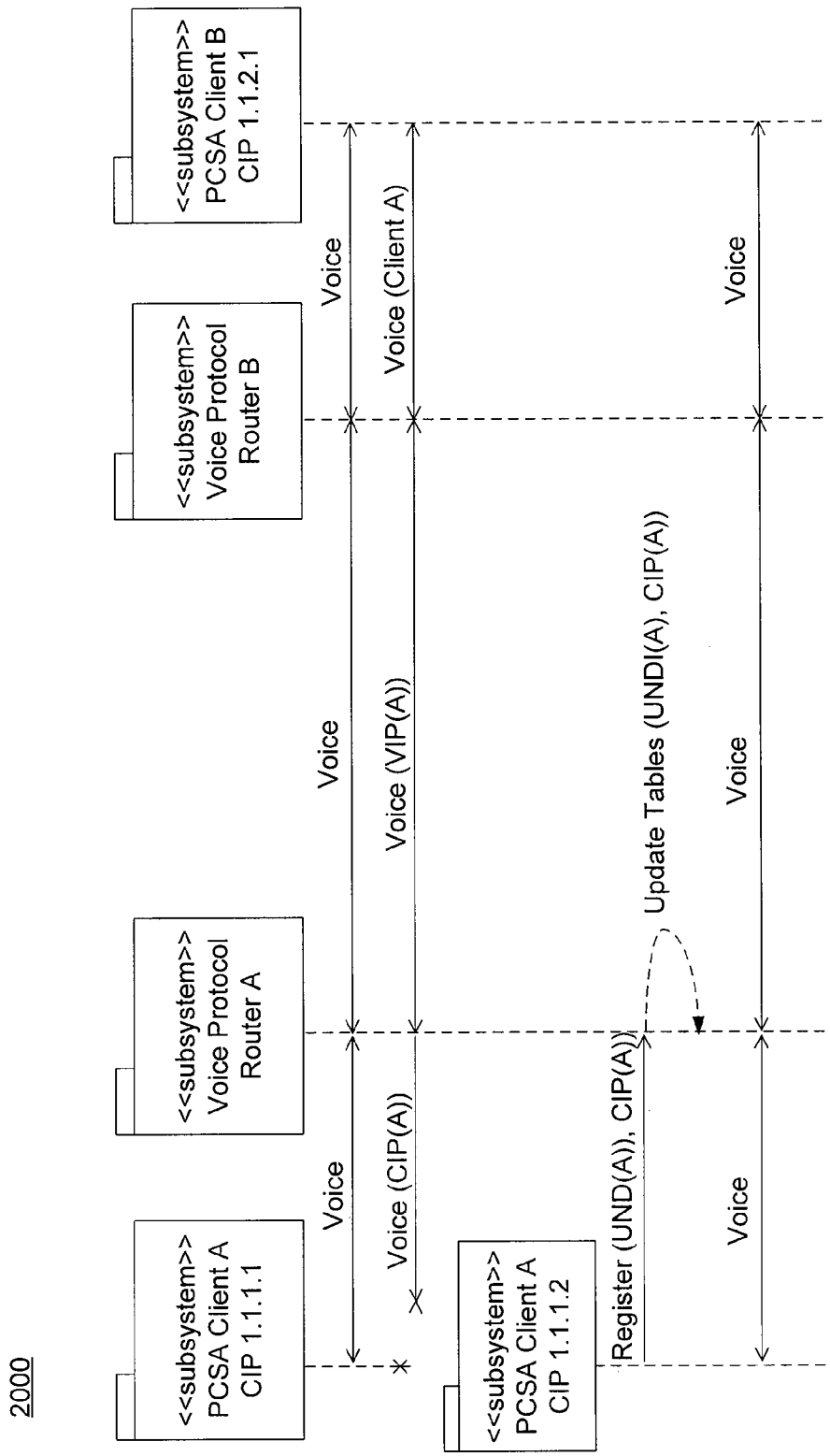
FIG. 20 is a flow diagram illustrating exemplary management of dynamic IP for maintaining high availability and maintenance of communications and control paths.

FIG. 20 illustrates the data flow for an established communications session between two CSA 100 endpoints across two MCEP sites, where one endpoint experiences a change in its carrier IP address during the call. This scenario demonstrates the ability of the MCEP to re-establish the communication path when the client performs the authenticated re-registration with VPR A. Once VPR A receives a new voice packet from the UNDI of Client A, the router updates the routing tables to reflect the new carrier IP of Client A. The full duplex voice traffic continues without having to re-establish the call. This scenario may be applicable to both Clear and Secure voice applications.

Failover for voice features in CSA 100 may be an addition to the system's MCEP Failover architecture. Accordingly, this mechanism may follow the MCEP architecture depicted below, with the addition of components applicable to voice communications.

CSA 100 clients, which are unable to communicate with the VPR in the primary MCEP site, may be responsible for proactively failing-over and registering with MCEP components at a secondary location.

When a CSA 100 Client registration cannot be resolved in the current Call Manager, the system may handle IP re-routing of call management information to the second Call Manager site. In one embodiment, a single SIP registration is required until the client has deemed that it should failover to the secondary location.

The PCS may be configured to support multi-site synchronization in partial failover scenarios. In the event that the PCS cannot locate CSA 100 client presence within its respective MCEP, PCS may remove the endpoint from the location and conclude, for example, that the location is either offline or has transitioned over to the secondary MCEP.

In the foregoing specification, the invention has been described with reference to specific embodiments. However, it may be appreciated that various modifications and changes may be made without departing from the scope of the present invention. The specification and figures are to be regarded in an illustrative manner, rather than a restrictive one, and all such modifications are intended to be included within the scope of present invention. Accordingly, the scope of the invention should be determined by the appended claims and their legal equivalents, rather than by the examples given above. For example, the steps recited in any of the method or process claims may be executed in any order and are not limited to the order presented.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical".

I claim:

1. A computer-implemented method for facilitating secure network communication at a remote communications device, said method comprising:
   receiving software code at said remote communications device, wherein said software code enables said remote communications device to facilitate said secure network communication by way of a Secure Communications Interoperability (SCIP) session;
   enabling a user of the remote communications device to select one of a packet switched protocol or a non-packet switched protocol for a communications protocol for said secure network communication;

receiving a request at said remote communications device to facilitate said secure network communication by way of said SCIP session;

performing transmission setup signaling; and establishing said SCIP session based on said transmission setup signaling and utilizing said selected communications protocol.

2. The method of claim 1, wherein said remote communications device is a cellular telephone.

3. The method of claim 1, wherein said remote communications device is configured in accordance with a SCIP specification to facilitate at least one of: end-to-end signaling, interoperability, cryptography, or secure session establishment.

4. The method of claim 1, further comprising providing at least one of: call prioritization and call precedence, wherein a voice application at said remote communications device receives priority over a resource competitive application.

5. The method of claim 1, further comprising providing a VOIP Quality of Service (QoS) function, wherein said QoS function includes at least one of: Differentiated Service (DiffServ) or Type of Service (ToS).

6. The method of claim 1, further comprising routing voice frames through a Multi-Carrier Entry Point (MCEP).

7. The method of claim 1, wherein at least one of: a user interface control element or a view element is independent of at least one of: a SoftPhone or a SCIP subsystem.

8. The method of claim 1, wherein said remote communications device includes a partition comprising at least one of: a model object, a view object, or a controller object, and wherein said model object maintains domain knowledge; said view object provides a display of data; and said controller object manages external interactions.

9. The method of claim 8, wherein an interface of said software code is notified when a state of said model object is modified.

10. The method of claim 8, wherein said model object presents data in accordance with parameters defined by said user interface.

11. The method of claim 8, wherein said view object provides a graphical representation that enables a user to at least one of: invoke or manage communications protocols.

12. The method of claim 8, wherein said display includes at least one of: a menu, a dialog, a menu bar, a status bar, or a title bar.

13. The method of claim 8, wherein said controller object includes at least one of: a button, a text input, or a menu.

14. The method of claim 8, wherein said control element includes at least one of: an internal timer event, a call state change, or a call duration timer.

15. The method of claim 1, wherein internal state changes to at least one of: a Call Manager client or a SCIP subsystem triggers a notification to a User Interface subsystem to modify view contents.

16. The method of claim 1, wherein said software code includes an independent and persistent subsystem, and wherein said independent and persistent subsystem comprises at least one of: a user interface, a Call Manager client, said SCIP session, or an Application Controller service.

17. The method of claim 16, wherein said independent and persistent subsystem facilitates at least one of: self initialization, initialization and configuration of dependent modules, or inter-subsystem synchronization.

18. The method of claim 1, wherein said software code includes a SCIP subsystem configured to at least one of: encode frames, encrypt frames, or pass frames into a network transport subsystem.

19. The method of claim 1, wherein a user interface subsystem interacts with at least one of: a Client Subsystem or a SCIP subsystem to facilitate at least one of: clear and secure call configuration, clear and secure call status, or clear and secure call control.

20. The method of claim 1, wherein said software code includes a Client Subsystem configured to facilitate at least one of: Clear Call setup, Clear Call maintenance, or Clear Call transmission.

21. The method of claim 20, wherein said Clear Call setup manages at least one of: a manual or an automated Session Initiation Protocol (SIP) registration request.

22. The method of claim 1, wherein said software code includes a SoftPhone subsystem configured to manage core SoftPhone functionality.

23. The method of claim 1, wherein said software code includes a Minimum Essential Requirements (MER) subsystem configured to maintain a network transport protocol.

* * * * *